(12) United States Patent
Olson et al.

(10) Patent No.: US 10,924,811 B2
(45) Date of Patent: Feb. 16, 2021

(54) COMPENSATION DEVICE FOR MAINTAINING A DESIRED SIGNAL QUALITY IN TRANSMITTED SIGNALS

(71) Applicant: PPC BROADBAND, INC., East Syracuse, NY (US)

(72) Inventors: Thomas A. Olson, Maryville, TN (US); David Kelma, Madisonville, TN (US); Joseph Lai, Los Angeles, CA (US); Steven K. Shafer, Chittenango, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 9 days.

(21) Appl. No.: 16/280,277

(22) Filed: Feb. 20, 2019

(65) Prior Publication Data

US 2019/0182555 A1 Jun. 13, 2019

Related U.S. Application Data

(63) Continuation of application No. 15/049,661, filed on Feb. 22, 2016, now Pat. No. 10,264,325, which is a continuation of application No. 14/337,424, filed on Jul. 22, 2014, now Pat. No. 9,271,026, which is a
(Continued)

(51) Int. Cl.
| | |
|---|---|
| *H04N 7/16* | (2011.01) |
| *H04N 21/61* | (2011.01) |
| *H04L 12/28* | (2006.01) |
| *H04N 7/10* | (2006.01) |
| *H04N 21/41* | (2011.01) |
| *H04N 21/643* | (2011.01) |

(52) U.S. Cl.
CPC ..... *H04N 21/6168* (2013.01); *H04L 12/2801* (2013.01); *H04N 7/102* (2013.01); *H04N 21/4104* (2013.01); *H04N 21/643* (2013.01)

(58) Field of Classification Search
CPC ............ H04L 12/2801; H04N 21/4104; H04N 21/6168; H04N 21/643; H04N 7/102
USPC .................................................. 725/118, 149
See application file for complete search history.

(56) References Cited

U.S. PATENT DOCUMENTS

| | | | |
|---|---|---|---|
| 3,790,909 A | 2/1974 | Le Fevre | |
| 4,007,487 A * | 2/1977 | Vlahos ..................... | H04N 9/75 348/587 |
| 4,418,424 A | 11/1983 | Kawamoto et al. | |

(Continued)

FOREIGN PATENT DOCUMENTS

| | | |
|---|---|---|
| CN | 101094375 A | 12/2007 |
| JP | 55080989 A | 8/1980 |

(Continued)

*Primary Examiner* — Pankaj Kumar
*Assistant Examiner* — Sahar Aqil Riaz
(74) *Attorney, Agent, or Firm* — MH2 Technology Law Group LLP

(57) ABSTRACT

A compensation device for maintaining a desired signal quality in transmitted signals includes a signal strength loss curve comparison component configured to compare a predetermined signal strength loss curve to a low band signal strength of a radio-frequency (RF) signal in an amplified forward path of a premise device. The compensation device also includes a gain curve adjustment component configured to output an adjusted gain curve across the RF signal in response to a comparison by the signal strength loss curve comparison component.

76 Claims, 11 Drawing Sheets

Related U.S. Application Data continuation of application No. 12/252,907, filed on Oct. 16, 2008, now Pat. No. 8,832,767.

(56) References Cited

U.S. PATENT DOCUMENTS

| | | |
|---|---|---|
| 4,512,033 A | 4/1985 | Schrock |
| 4,520,508 A | 5/1985 | Reichert, Jr. |
| 4,521,920 A | 6/1985 | Forsberg et al. |
| 4,648,123 A | 3/1987 | Schrock |
| 4,677,390 A | 6/1987 | Wagner |
| 4,961,218 A | 10/1990 | Kiko |
| 4,982,440 A | 1/1991 | Dufresne et al. |
| 5,010,399 A | 4/1991 | Goodman et al. |
| 5,126,840 A | 6/1992 | Dufresne et al. |
| 5,214,505 A | 5/1993 | Rabowsky et al. |
| 5,231,660 A * | 7/1993 | West, Jr. ............... H04K 3/42 348/E7.052 |
| 5,235,612 A | 8/1993 | Stilwell et al. |
| 5,345,504 A | 9/1994 | West, Jr. |
| 5,361,394 A | 11/1994 | Shigihara |
| 5,369,642 A | 11/1994 | Shioka et al. |
| 5,548,255 A | 8/1996 | Spielman |
| 5,745,836 A | 4/1998 | Williams |
| 5,815,794 A | 9/1998 | Williams |
| 5,839,052 A | 11/1998 | Dean et al. |
| 5,893,024 A | 4/1999 | Sanders et al. |
| 5,937,330 A | 8/1999 | Vince et al. |
| 5,950,111 A | 9/1999 | Georger et al. |
| 5,956,075 A | 9/1999 | Matsuo |
| 5,970,053 A | 10/1999 | Schick et al. |
| 6,014,547 A | 1/2000 | Caporizzo et al. |
| 6,049,693 A | 4/2000 | Baran et al. |
| 6,069,960 A | 5/2000 | Mizukami et al. |
| 6,094,211 A | 7/2000 | Baran et al. |
| 6,160,990 A | 12/2000 | Kobayashi et al. |
| 6,205,138 B1 | 3/2001 | Nihal et al. |
| 6,208,846 B1 | 3/2001 | Chen |
| 6,253,077 B1 | 6/2001 | Burt et al. |
| 6,348,837 B1 | 2/2002 | Ibelings |
| 6,348,955 B1 | 2/2002 | Tait |
| 6,373,349 B2 | 4/2002 | Gilbert |
| 6,377,316 B1 | 4/2002 | Mycynek et al. |
| 6,388,539 B1 | 5/2002 | Rice |
| 6,425,132 B1 | 7/2002 | Chappell |
| 6,495,998 B1 | 12/2002 | Terreault et al. |
| 6,498,925 B1 | 12/2002 | Tauchi |
| 6,510,152 B1 | 1/2003 | Gerszberg et al. |
| 6,560,778 B1 | 5/2003 | Hasegawa |
| 6,570,914 B1 | 5/2003 | Ichihara |
| 6,570,928 B1 | 5/2003 | Shibata |
| 6,587,012 B1 | 7/2003 | Farmer et al. |
| 6,622,304 B1 | 9/2003 | Carhart |
| 6,640,338 B1 | 10/2003 | Shibata |
| 6,653,751 B1 | 11/2003 | Teh Lo |
| 6,678,893 B1 | 1/2004 | Jung |
| 6,683,513 B2 | 1/2004 | Shamsaifar et al. |
| 6,725,462 B1 | 4/2004 | Kaplan |
| 6,725,463 B1 | 4/2004 | Birleson |
| 6,728,968 B1 | 4/2004 | Abe et al. |
| 6,757,910 B1 | 6/2004 | Bianu |
| 6,804,828 B1 | 10/2004 | Shibata |
| 6,845,232 B2 | 1/2005 | Darabi |
| 6,877,166 B1 | 4/2005 | Roeck et al. |
| 6,880,170 B1 | 4/2005 | Kauffman et al. |
| 6,928,175 B1 | 8/2005 | Bader et al. |
| 7,003,275 B1 | 2/2006 | Petrovic |
| 7,029,293 B2 | 4/2006 | Shapson et al. |
| 7,039,432 B2 | 5/2006 | Strater et al. |
| 7,162,731 B2 | 1/2007 | Reidhead et al. |
| 7,167,693 B2 | 1/2007 | Bachman, II et al. |
| 7,283,479 B2 | 10/2007 | Ljundahi et al. |
| 7,454,252 B2 | 11/2008 | El-Sayed |
| 7,505,819 B2 | 3/2009 | El-Sayed |
| 7,530,091 B2 | 5/2009 | Vaughan |
| 7,603,693 B2 | 10/2009 | Masuda et al. |
| 7,742,777 B2 | 6/2010 | Strater et al. |
| 7,748,023 B2 | 6/2010 | Weinstein et al. |
| 8,001,579 B2 | 8/2011 | Olson et al. |
| 8,213,457 B2 | 7/2012 | Kelma et al. |
| 2002/0141347 A1 | 10/2002 | Harp et al. |
| 2002/0141494 A1 | 10/2002 | Chappell |
| 2002/0144292 A1 | 10/2002 | Uemura et al. |
| 2002/0166124 A1 | 11/2002 | Gurantz et al. |
| 2002/0174435 A1 | 11/2002 | Weinstein et al. |
| 2002/0191718 A1 * | 12/2002 | Ellis, Sr. ............... H04N 7/102 375/345 |
| 2003/0149991 A1 * | 8/2003 | Reidhead ......... H04N 21/64723 725/119 |
| 2004/0076192 A1 | 4/2004 | Zerbe et al. |
| 2004/0172659 A1 | 9/2004 | Ljungdahl et al. |
| 2004/0229561 A1 | 11/2004 | Cowley et al. |
| 2004/0261121 A1 * | 12/2004 | Bishop .................. G01S 1/00 725/129 |
| 2005/0155082 A1 | 7/2005 | Weinstein et al. |
| 2005/0183130 A1 | 8/2005 | Sadja et al. |
| 2005/0283815 A1 | 12/2005 | Brooks et al. |
| 2005/0289632 A1 | 12/2005 | Brooks et al. |
| 2006/0012921 A1 | 1/2006 | Vaughan |
| 2006/0148406 A1 | 7/2006 | Stater et al. |
| 2006/0205442 A1 | 9/2006 | Phillips et al. |
| 2006/0282871 A1 | 12/2006 | Yo |
| 2007/0028280 A1 | 2/2007 | Bishop |
| 2007/0288981 A1 | 12/2007 | Misuse et al. |
| 2007/0288982 A1 | 12/2007 | Donahue |
| 2007/0300284 A1 * | 12/2007 | Hall ..................... H04N 7/108 725/149 |
| 2008/0022344 A1 | 1/2008 | Riggsby |
| 2008/0040764 A1 | 2/2008 | Weinstein et al. |
| 2008/0127287 A1 | 5/2008 | Alkan |
| 2009/0031391 A1 | 1/2009 | Urbanek |
| 2009/0047917 A1 | 2/2009 | Phillips et al. |
| 2009/0077608 A1 | 3/2009 | Romerein et al. |
| 2009/0096517 A1 * | 4/2009 | Huang ................ H04B 1/1036 327/556 |
| 2009/0113510 A1 | 4/2009 | Knutson et al. |
| 2009/0154369 A1 | 6/2009 | Helvig et al. |
| 2009/0316608 A1 | 12/2009 | Singh et al. |
| 2009/0320085 A1 | 12/2009 | Wang |
| 2010/0095344 A1 | 4/2010 | Newby |
| 2010/0100912 A1 | 4/2010 | Olson et al. |
| 2011/0085452 A1 | 4/2011 | Kelma et al. |
| 2011/0085480 A1 | 4/2011 | Kelma et al. |
| 2011/0085586 A1 | 4/2011 | Kelma et al. |
| 2011/0088077 A1 | 4/2011 | Kelma et al. |
| 2011/0138440 A1 * | 6/2011 | Shafer .................. H04N 7/106 725/151 |

FOREIGN PATENT DOCUMENTS

| | | |
|---|---|---|
| JP | 55132126 A | 10/1980 |
| JP | 57091055 A | 6/1982 |
| JP | 58101582 U | 6/1983 |
| JP | 5899913 | 7/1983 |
| JP | 61157035 A | 7/1986 |
| JP | 5191416 A | 7/1993 |
| JP | 07038580 A | 2/1995 |
| JP | 11069334 A | 3/1999 |
| JP | 2001177580 A | 6/2001 |
| JP | 2004080483 A | 3/2004 |
| JP | 2005005875 A | 1/2005 |
| JP | 2007166109 A | 6/2007 |
| JP | 2007166110 A | 6/2007 |
| WO | 0024124 | 4/2000 |
| WO | 0172005 A1 | 9/2001 |
| WO | 0233969 A1 | 4/2002 |
| WO | 02091676 A1 | 11/2002 |

* cited by examiner

COMPENSATION DEVICE FOR MAINTAINING A DESIRED SIGNAL QUALITY IN TRANSMITTED SIGNALS

CROSS-REFERENCE TO RELATED APPLICATIONS

This application is a continuation of, and claims the benefit and priority of, U.S. patent application Ser. No. 15/049,661, filed Feb. 22, 2016, which is a continuation of U.S. patent application Ser. No. 14/337,434, filed Jul. 22, 2014, now U.S. Pat. No. 9,271,026, which is a continuation of U.S. patent application Ser. No. 12/252,907, filed on Oct. 16, 2008, now U.S. Pat. No. 8,832,767. The entire contents of which are hereby incorporated by reference.

BACKGROUND OF THE INVENTION

The use of a cable television ("CATV") system to provide internet, voice over internet protocol ("VOIP") telephone, television, and radio services is well known in the art. In providing these services, a downstream bandwidth (i.e., radio frequency ("RF") signals, digital signals, optical signals, etc.) is passed from a supplier of the services to a user and an upstream bandwidth is passed from the user to the supplier. The downstream bandwidth is passed, for example, within relatively higher frequencies from within a total bandwidth of the CATV system while the upstream bandwidth is passed within relatively lower frequencies.

Traditionally, the size of the downstream bandwidth far exceeds the size of the upstream bandwidth due to nature of the services provided. For example, while the downstream bandwidth must accommodate all of the television and radio programming along with internet and VOIP downloading, the upstream bandwidth is only required to accommodate internet, system control signals, and VOIP uploading. Problems are arising, however, due to an increase in upstream bandwidth usage caused by an increasing demand for higher speed internet uploads and the increasing demand for the VOIP telephone services.

VOIP telephone services places significant demands on the upstream bandwidth. When a user uploads a large image file to a photo sharing website, the image file will be parsed into a number of data packets that can be intermixed with other data packets being passed through a particular portion of the upstream bandwidth by other users located on a particular signal transmission line within the CATV system. To optimize a total data throughput on the particular signal transmission line, the data packets may be significantly delayed and/or reorganized without any knowledge of or inconvenience to the user. When a user uses VOIP telephone services, their voice is converted into data packets that are similar in form to the data packets used to upload the image file. Because a typical conversation is carried out in real time, meaning that a contiguous and unbroken flow of data packets is required, any person with whom the user is talking will quickly notice significant delays in the delivery of the data packets and/or reorganization of the data packets that results in audio distortion of the user's voice. Any such reorganization and/or delay in the uploading of data packets carrying VOIP telephone services are measured in terms of jitter, and are closely monitored because of the significant service quality characteristics it represents.

Jitter experienced between the user and their caller is a direct result of network congestion within the upstream bandwidth. Because the upstream bandwidth is shared by all users on the particular signal transmission line, each user is competing with the other users for packet data space within the upstream bandwidth. Even further, each of the users can unknowingly inject interference signals, such as noise, spurious signals, and other undesirable signals, into the upstream bandwidth through the use of common household items and poor quality wiring in the user's premise, the interference signals causing errors that force a slow down and an additional amount of jitter in the upstream flow of packets.

In an effort to increase the upstream flow of packets, several suppliers have a plan to increase the size of the upstream bandwidth from 5-42 Mhz to 5-85 Mhz to allow a greater flow of the upstream content. Along with such an increase, the downstream bandwidth must be correspondingly decreased in size because the total bandwidth is relatively fixed. Such a change is, however, very difficult to implement.

Traditional practices would require that every drop amplifier and two way (diplex) filter in network amplifiers and nodes of the CATV system to be changed as part of the increasing the size of the upstream bandwidth. Compounding the difficulty of implementing such a change, all of the changes must be implemented at various locations throughout the CATV system at a single, particular time. Accordingly, such an implementation is time consuming, costly, and difficult to coordinate.

Further, while increasing the size of the upstream bandwidth may incrementally increase the flow of upstream data packets, the upstream bandwidth remains susceptible to reliability/congestion issues since it is based on an inherent, system wide flaw that leaves the upstream bandwidth open and easily impacted by any single user. For example, while the downstream bandwidth is constantly monitored and serviced by skilled network engineers, the upstream bandwidth is created and passed using an infrastructure within a user's premise that is maintained by the user without the skill or knowledge required to reduce the creation and passage of interference signals into the upstream bandwidth. This issue is further compounded by the fact that over 500 premises can be connected together such that interference signals generated by one of the 500 premises can easily impact all of the remaining premises. It is common in the art for the supplier to add physical filters between the user's premise and a tap from of the main signal distribution system near the users premise to reduce the impact of the interference signals generated on the user's premise, but such a physical filter must be installed manually and does not account for significant, transient interference sources such as garbage disposals, vacuum cleaners, welders, powered hand tools, etc.

Even further, increasing the size of the upstream bandwidth forces suppliers to push their downstream content into increasingly higher frequency portions of the downstream bandwidth. Unfortunately, these higher frequencies are much more susceptible to parasitic losses in signal strength caused by the signal transmission lines, connectors on the user's premise, devices connected to the signal transmission lines on the user's premise, etc. In the past many users have added relatively low-tech drop amplifiers on their premise to account for such losses. Because of the changes to increase the size of the upstream bandwidth, all of these drop amplifiers must be removed and or replaced. Additionally, because of the increased demands placed on the downstream content (e.g., high definition television, increased compression, etc.) the signal strength (i.e., level) of the downstream bandwidth must be maintained to closer tolerances than can typically be provided by the typical low-tech drop amplifier.

Accordingly, as a result of increasing the size of the upstream bandwidth, the quality of the content moved to the higher frequencies within the downstream bandwidth may be significantly lessened causing a decrease in customer satisfaction and an increase in costly service calls.

In light of the forgoing, increasing the size of the upstream bandwidth: (i) may require a significant amount of capital expenditure in terms new filter devices and the manpower to install the devices; (ii) may not result in the expected large increases in upstream data throughput because of the interference signals injected from within each user's premise; (iii) may result in lower quality downstream content, and (iv) may inject additional interference signals that now fall within the additional upstream bandwidth, which would have otherwise been filtered out.

Therefore, there is a need to overcome, or otherwise lessen the effects of, the disadvantages and shortcomings described above.

SUMMARY OF THE INVENTION

The present invention helps to reduce the complexity and cost involved with changing the size of an upstream bandwidth. Specifically, the present invention allows a CATV supplier to implement such a change in the size at a common, specific time to all users of the CATV services.

Further, the present invention can be added to a variety of other devices that require a defined separation between the upstream bandwidth and the downstream bandwidth. The incorporation of the present invention allows such other devices to remain relevant after a change in the size of the upstream bandwidth.

In accordance with one embodiment of the present invention, a compensation device for maintaining a desired signal quality in transmitted signals is provided. The compensation device includes a signal strength loss curve comparison component configured to compare a predetermined signal strength loss curve to a low band signal strength of a radio-frequency (RF) signal in an amplified forward path of a premise device. The compensation device also includes a gain curve adjustment component configured to output an adjusted gain curve across the RF signal in response to a comparison by the signal strength loss curve comparison component.

In accordance with one embodiment of the present invention, a compensation device for maintaining a desired signal quality in transmitted signals is provided. The compensation device includes a comparison component configured to compare a signal strength loss curve to a low band signal strength of a radio-frequency (RF) signal in an amplified forward path of a premise device. The compensation device also includes a gain curve adjustment component configured to output an adjusted gain curve across the RF signal in response to a comparison by the comparison component.

In accordance with one embodiment of the present invention, a compensation device for maintaining a desired signal quality in transmitted signals is provided. The compensation device includes a signal strength loss comparator configured to compare a signal strength loss threshold to a low band signal strength of a radio-frequency (RF) signal in an amplified forward path of a premise device. The compensation device also includes a gain curve adjuster configured to output an adjusted gain curve across the RF signal in the amplified forward path of the premise device based on only a comparison by the signal strength loss comparator.

In accordance with one embodiment of the present invention, a compensation device for maintaining a desired signal quality in transmitted signals is provided. The compensation device includes a signal strength loss comparator configured to compare a signal strength loss threshold to a low band signal strength of a radio-frequency (RF) signal in an amplified forward path of a premise device. The compensation device also includes a gain curve adjuster configured to output an adjusted gain curve across the RF signal in the amplified forward path of the premise device based on a comparison by the signal strength loss comparator.

In accordance with one embodiment of the present invention, a compensation device for maintaining a desired signal quality in transmitted signals is provided. The compensation device includes a signal strength loss comparator configured to compare a signal strength loss threshold to a low band signal strength of a radio-frequency (RF) signal in an amplified forward path of a premise device. The compensation device also includes a gain curve adjuster configured to cause the compensation device to output an adjusted gain curve across the RF signal in the amplified forward path of the premise device based on a signal strength loss comparison by the signal strength loss comparator.

In accordance with one embodiment of the present invention, compensation means for maintaining a desired signal quality in transmitted signals are provided. The compensation means include signal strength loss comparison means for comparing a signal strength loss threshold to a low band signal strength of a radio-frequency (RF) signal in an amplified forward path of a premise device. The compensation means also include gain curve adjustment means for causing the compensation means to output an adjusted gain curve across the RF signal in the amplified forward path of the premise device based on a signal strength loss comparison by the signal strength loss comparison means.

In accordance with one embodiment of the present invention, a compensation device for maintaining a desired signal quality in transmitted signals in an amplified forward path of a premise device is provided. The compensation device includes a signal strength loss comparison component configured to compare a predetermined loss curve threshold to a low band signal strength of a radio-frequency (RF) signal through the amplified forward path of the premise device and a high band signal strength of the RF signal through the amplified forward path of the premise device. The compensation device also includes an output adjustment component configured to cause the compensation device to output an adjusted gain curve across the RF signal based on a comparison by the signal strength loss comparison component.

In accordance with one embodiment of the present invention, a compensation device for maintaining a desired signal quality in transmitted signals in an amplified forward path of a premise device is provided. The compensation device includes a signal strength loss comparator configured to compare a loss curve threshold to a low band signal strength of a radio-frequency (RF) signal through the amplified forward path of the premise device and a high band signal strength of the RF signal through the amplified forward path of the premise device. The compensation device also includes an output adjustor configured to cause the compensation device to output an adjusted gain curve across the RF signal based on a comparison by the signal strength loss comparator.

In accordance with one embodiment of the present invention, compensation means for maintaining a desired signal quality in transmitted signals in an amplified forward path of a premise device is provided. The compensation means include comparison means for comparing a loss curve threshold to a low band signal strength of a radio-frequency (RF) signal through the amplified forward path of the premise device and a high band signal strength of the RF signal through the amplified forward path of the premise device. The compensation means also include adjustment means for causing the compensation means to output an adjusted gain curve across the RF signal based on a comparison by the comparison means.

In accordance with one embodiment of the present invention, a compensation device for maintaining a desired signal quality in transmitted signals in an amplified forward path of a premise device is provided. The compensation device includes a signal strength loss comparator configured to compare a loss curve threshold to a high band signal strength of a radio-frequency (RF) signal through the amplified forward path of the premise device. The compensation device also includes an output adjustor configured to cause the compensation device to output an adjusted gain curve across the RF signal based on a comparison by the signal strength loss comparator.

In accordance with one embodiment of the present invention, compensation means for maintaining a desired signal quality in transmitted signals in an amplified forward path of a premise device are provided. The compensation means include comparison means for comparing a loss curve threshold to a high band signal strength of a radio-frequency (RF) signal through the amplified forward path of the premise device. The compensation means also include adjustment means for causing the compensation means to output an adjusted gain curve across the RF signal based on a comparison by the comparison means.

BRIEF DESCRIPTION OF THE DRAWINGS

For a further understanding of the nature and objects of the invention, references should be made to the following detailed description of a preferred mode of practicing the invention, read in connection with the accompanying drawings in which.

DETAILED DESCRIPTION OF THE INVENTION

Figure 1:
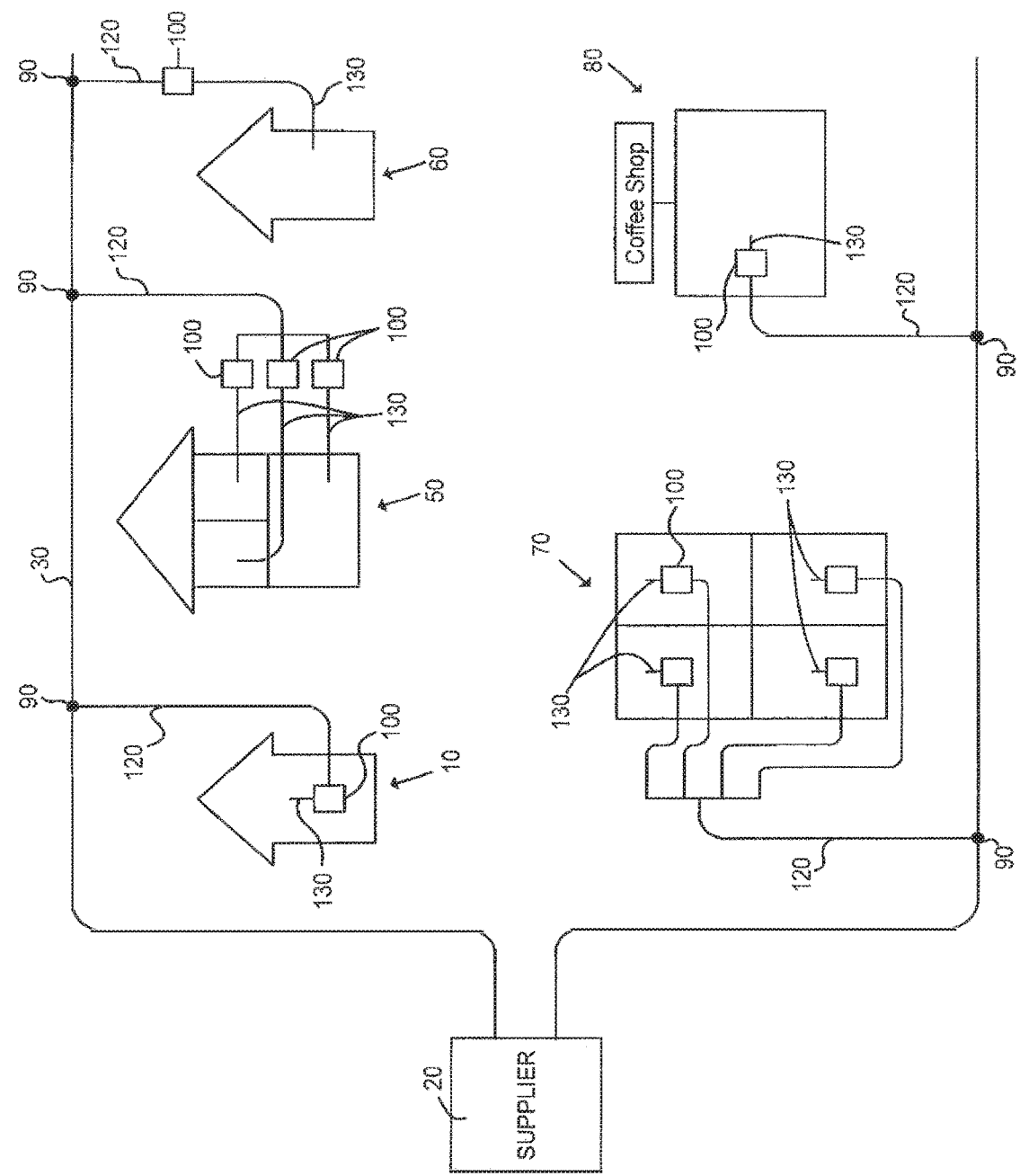
FIG. 1 is a graphical representation of a CATV system arranged in accordance with an embodiment of the present invention.

As shown in FIG. 1, a cable television ("CATV") system typically includes a supplier 20 that transmits downstream signals, such as radio frequency ("RF") signals, digital signals, optical signals, etc., to a user through a main signal distribution system 30 and receives upstream signals from a user through the same main signal distribution system 30. A tap 90 is located at the main signal distribution system 30 to allow for the passage of the downstream\upstream signals from\to the main signal distribution system 30. A drop transmission line 120 is then used to connect the tap 90 to a house 10, 60, an apartment building 50, 70, a coffee shop 80, and so on. A premise device 100 of the present invention is connected in series or in parallel between the drop transmission line 120 and a user's premise distribution system 130.

Referring still to FIG. 1, is should be understood that the premise device 100 can be placed at any location between the tap 90 and the user's premise distribution system 130. This location can be conveniently located within the building 10, or exterior to the building 60. Similarly, the premise device 100 can be located within individual apartments of the apartment building 70 or exterior to the apartment building 50. It should be understood that the premise device 100 can be placed at any location, such as the coffee shop 80 or other business, where CATV services, including internet, VOIP, or other unidirectional\bidirectional services are being used.

Figure 2:
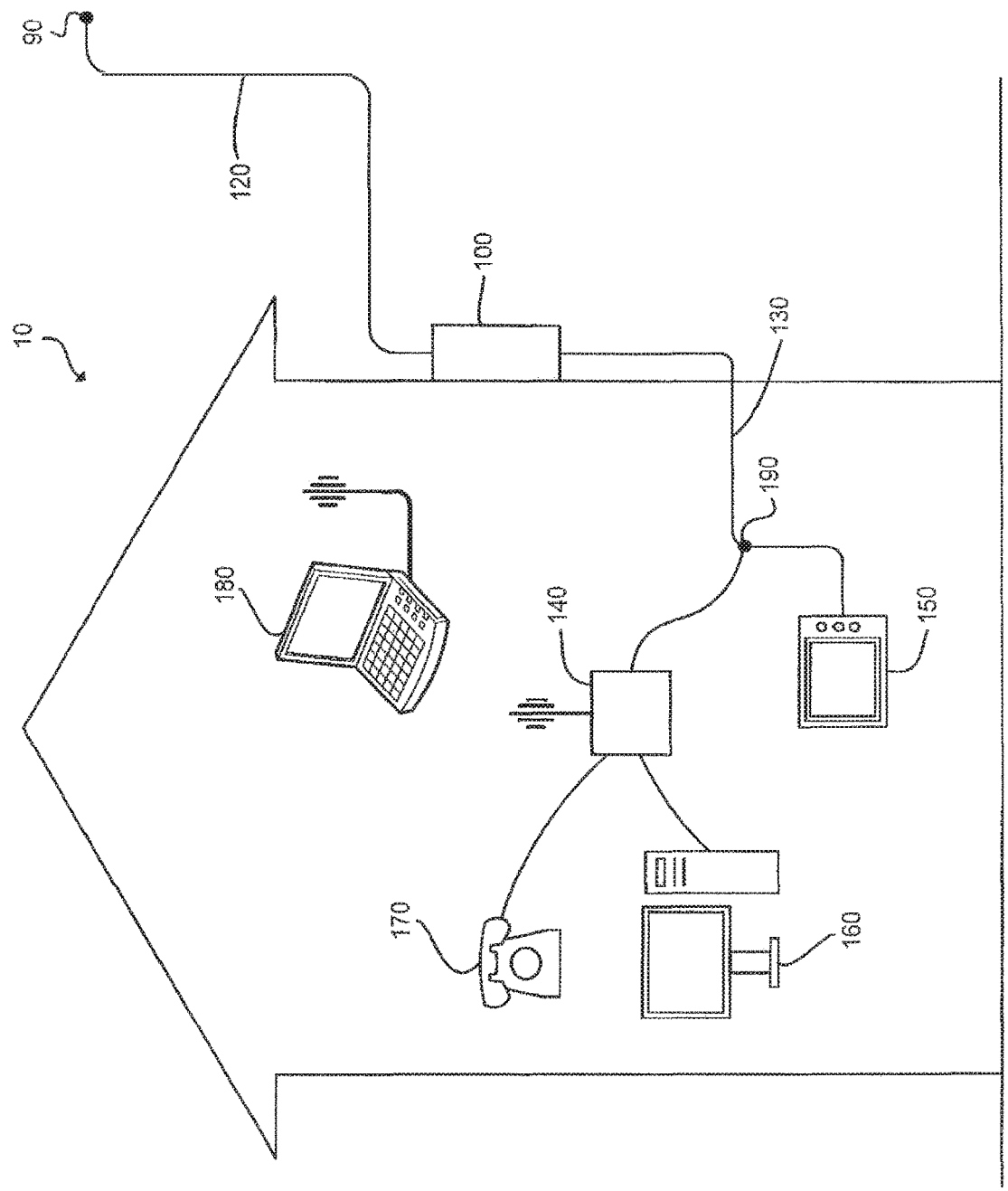
FIG. 2 is a graphical representation of a user's premise arranged in accordance with an embodiment of the present invention.

As shown in FIG. 2, the user's premise distribution system 130 can then be split using a splitter 190 so that upstream/downstream signals can pass to a television 150 and a modem 140 in accordance with practices well known in the art. The modem 140 can include voice over internet protocol ("VOIP") capabilities affording telephone 170 services and can include a router affording Internet services to a desktop computer 160 and a laptop computer 180, for example.

Additionally, it is common practice to provide a "set-top box" ("STB") or "set-top unit" ("STU") for use directly with the television 150. For the sake of clarity, however, there is no representation of an STB or STU included in FIG. 2. The STB and STU are mentioned here in light of the fact that many models utilize the upstream bandwidth to transmit information relating to "pay-per-view" purchases, billing, etc. Accordingly, it should be understood that even though FIG. 2 explicitly shows that there is only one premise device 100 used for each device generating upstream data packets, each premises device 100 can be used with two or more devices (e.g. a modem, a STB, a STU, a dedicated VOIP server, etc.) that transmit upstream data packets via the upstream bandwidth.

Figure 3:
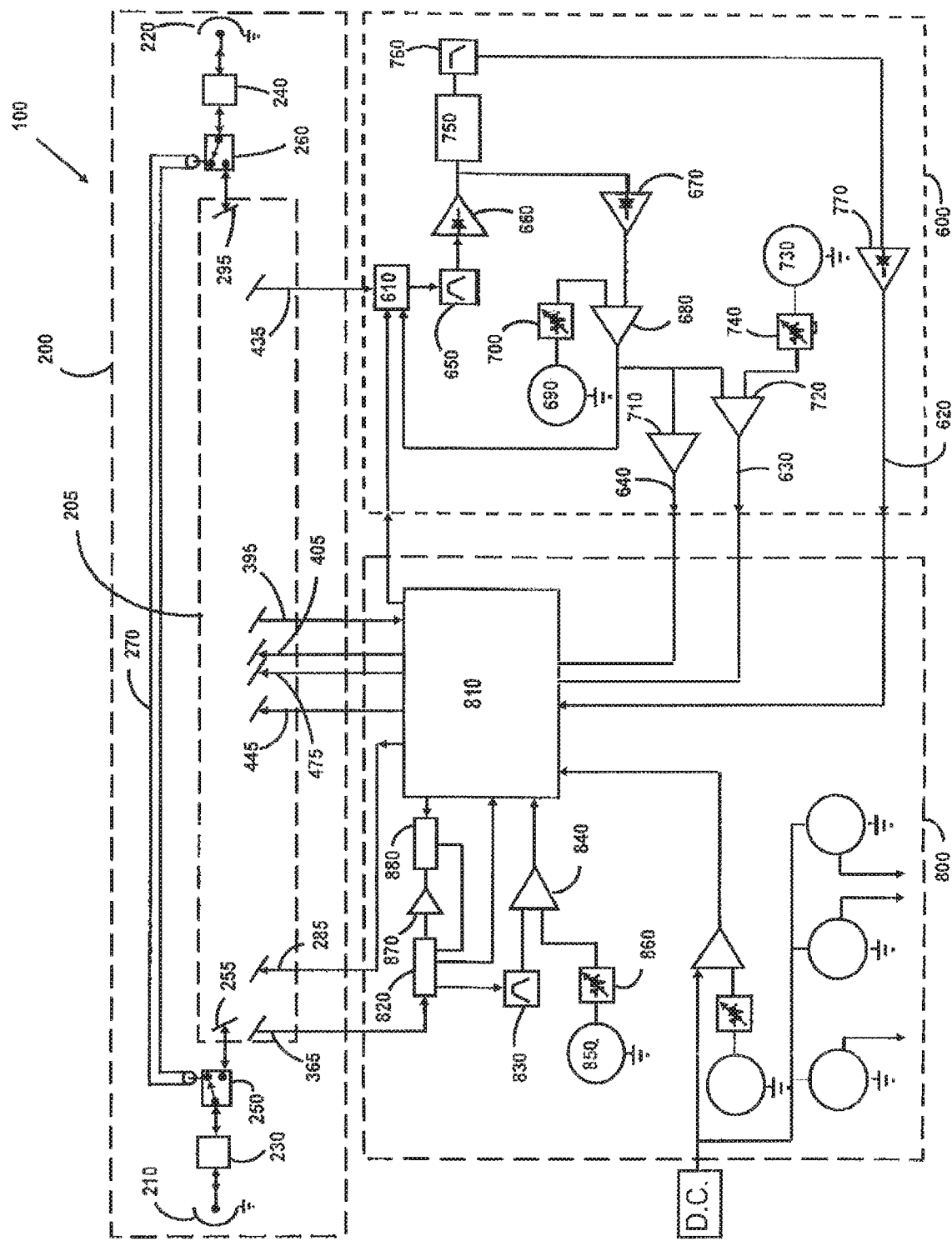
FIG. 3 is a partial circuit diagram of a premise device made in accordance with an embodiment of the present invention.

Referring to FIG. 3, the premise device 100 includes a main circuit 200 that is positioned along with a tuner circuit 600 and a microprocessor circuit 800. Preferably, the combination of circuits 200, 600, 800 forms a configurable frequency band selection device 1 (represented separately in FIG. 5), an upstream bandwidth conditioning device 2 (represented separately in FIGS. 6a and 6b) and a downstream output level and/or output level tilt compensation device 3 (represented separately in FIG. 8), each of which will be discussed separately in greater detail below. It should be understood, however, that circuits 200, 600, 800 of the premise device 100 can be configured to form any combination of the devices such that the premise device 100 may include any one of the devices, any two the devices, or all three of the devices. Preferably, each of the circuits are positioned within a single enclosure, but it should be understood that circuits 200, 600, 800 could be arranged within multiple enclosures to account for space, cost, better resultant performance, or other environmental considerations.

Figure 4:
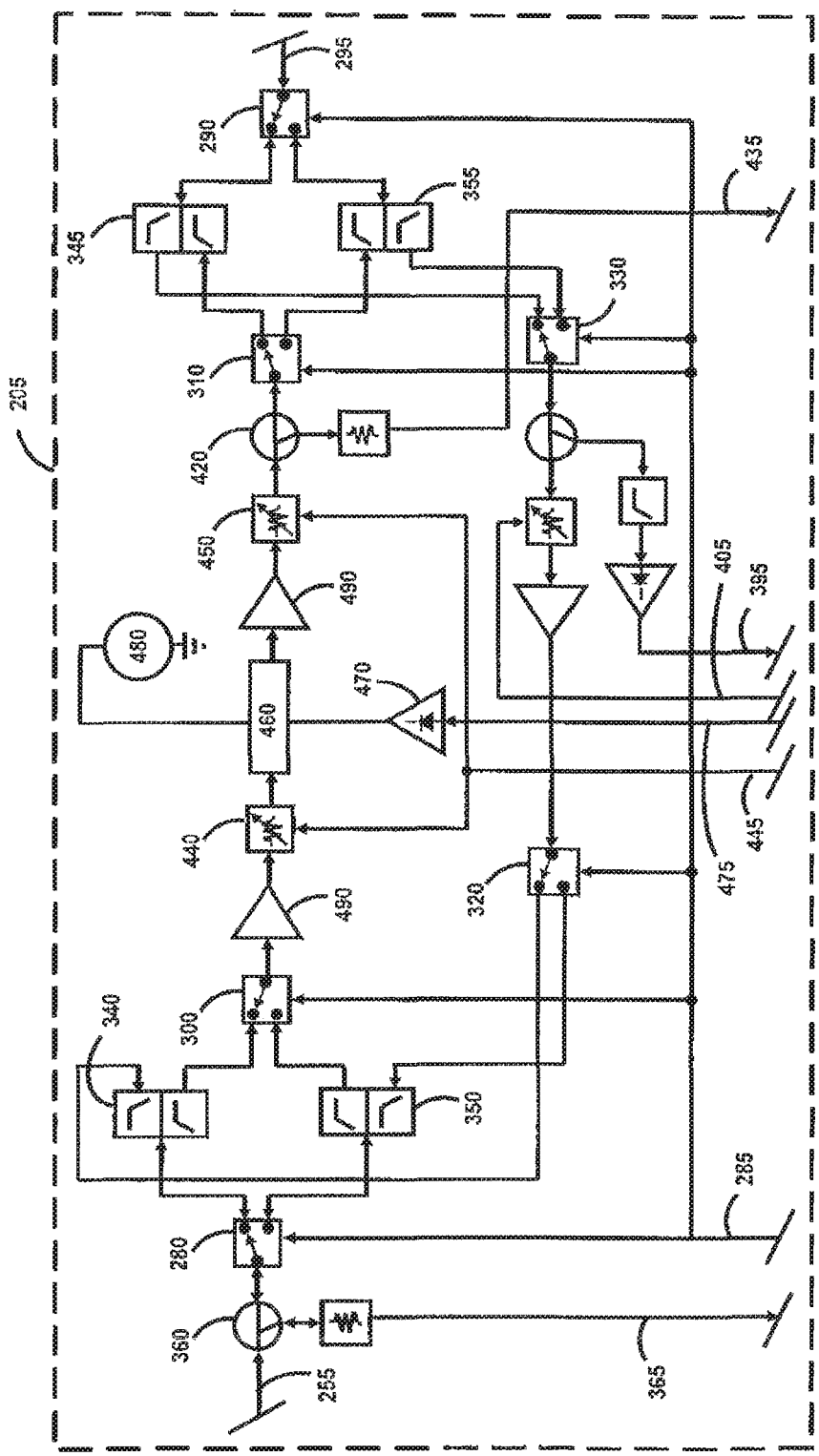
FIG. 4 is a partial circuit diagram of the premise device represented in FIG. 3.

Because a diagram of a premise device 100 including all three devices is too complex to be clearly represented in one figure, a circuit 205 of the main circuit 200, as it is represented in FIG. 3, is represented in FIG. 4 with inputs and outputs between itself and the remaining positions of the circuit 200 in FIG. 3 labeled similarly.

Figure 5:
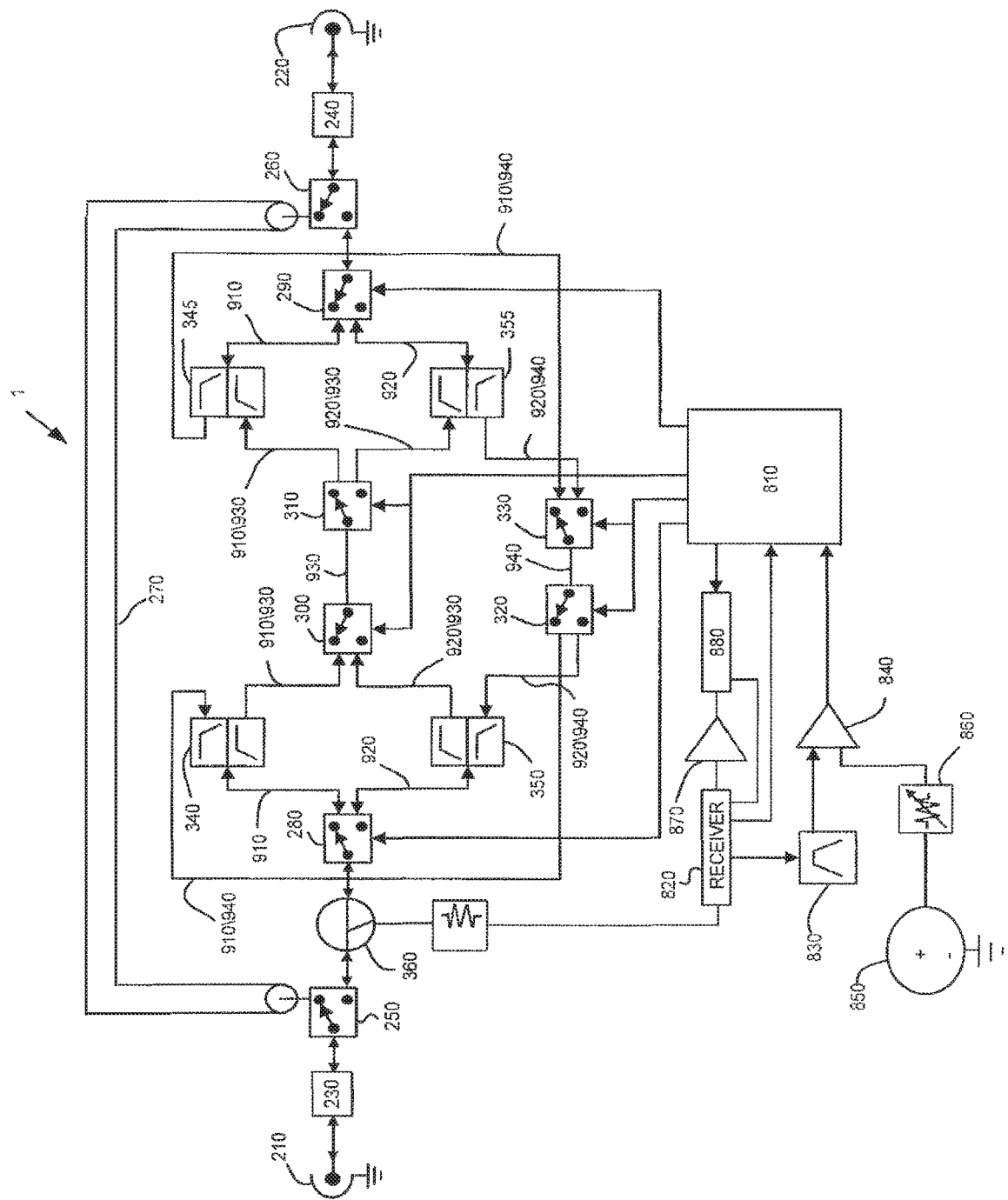
FIG. 5 is a circuit diagram representing a premise device including a configurable frequency band selection device made in accordance with another embodiment of the present invention.
Figure 6A:
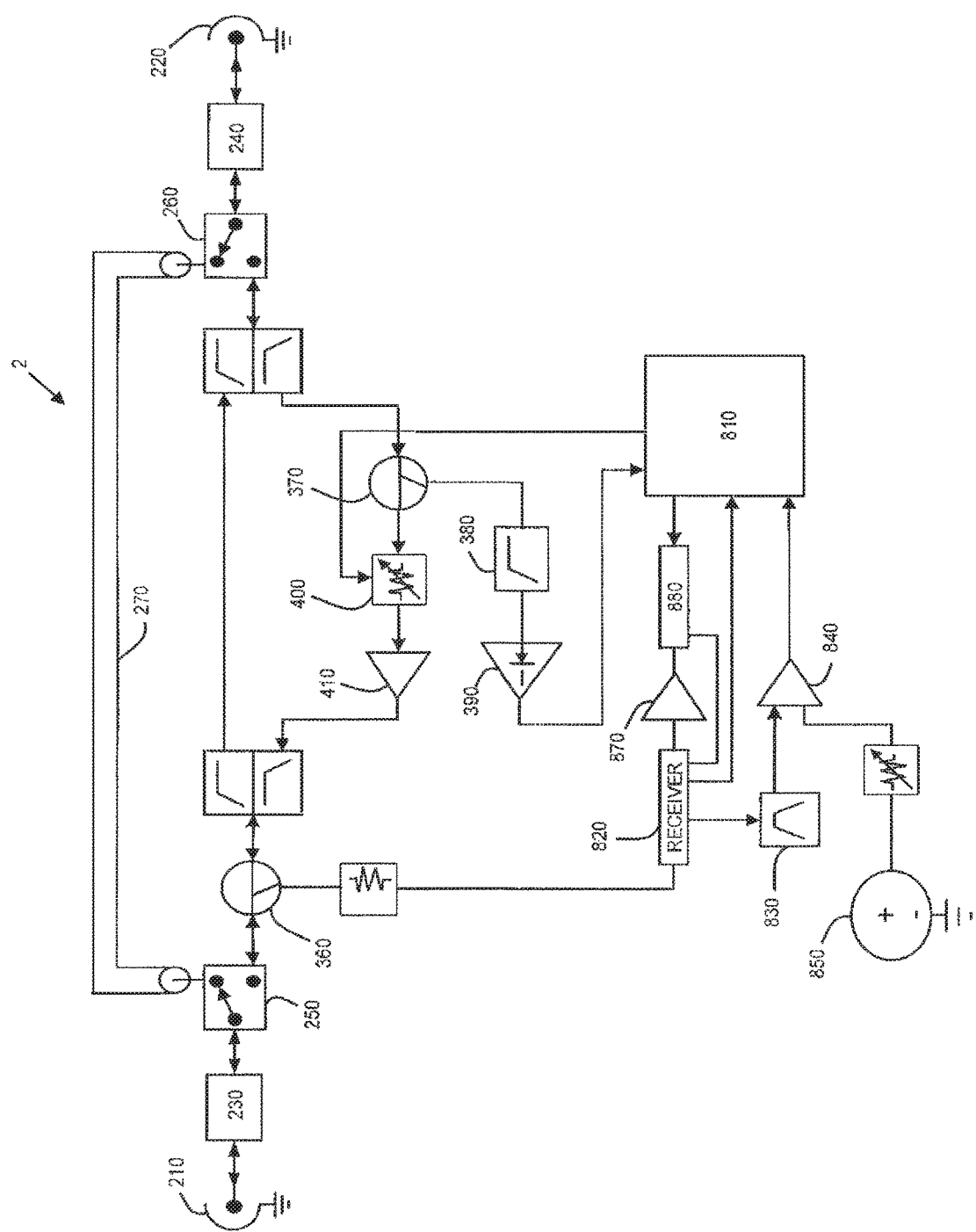
FIG. 6*a* is a circuit diagram representing a premise device including an upstream bandwidth conditioning device made in accordance with another embodiment of the present invention.
Figure 6B:
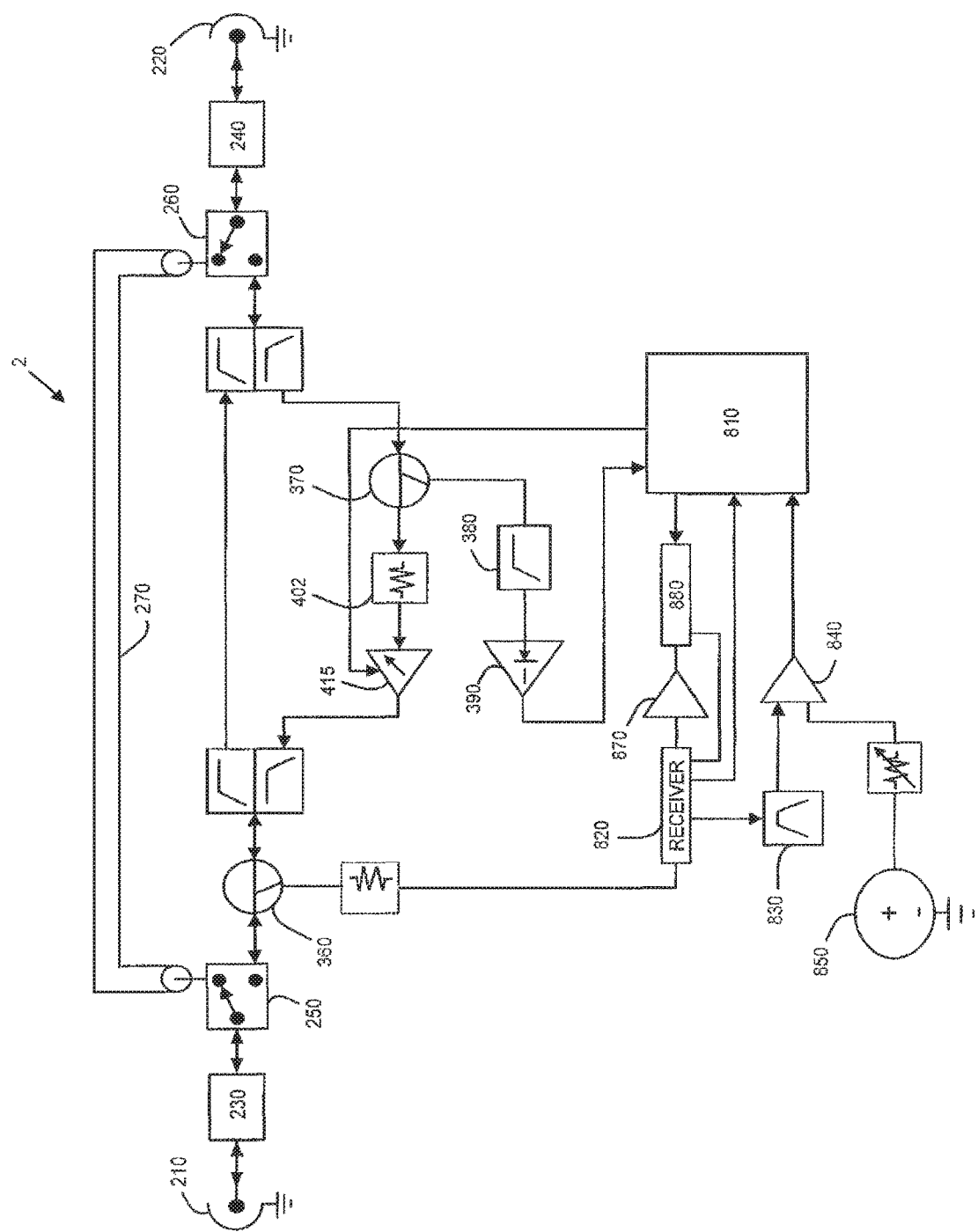
FIG. 6*b* is a circuit diagram representing a premise device including an upstream bandwidth conditioning device made in accordance with another embodiment of the present invention.
Figure 8:
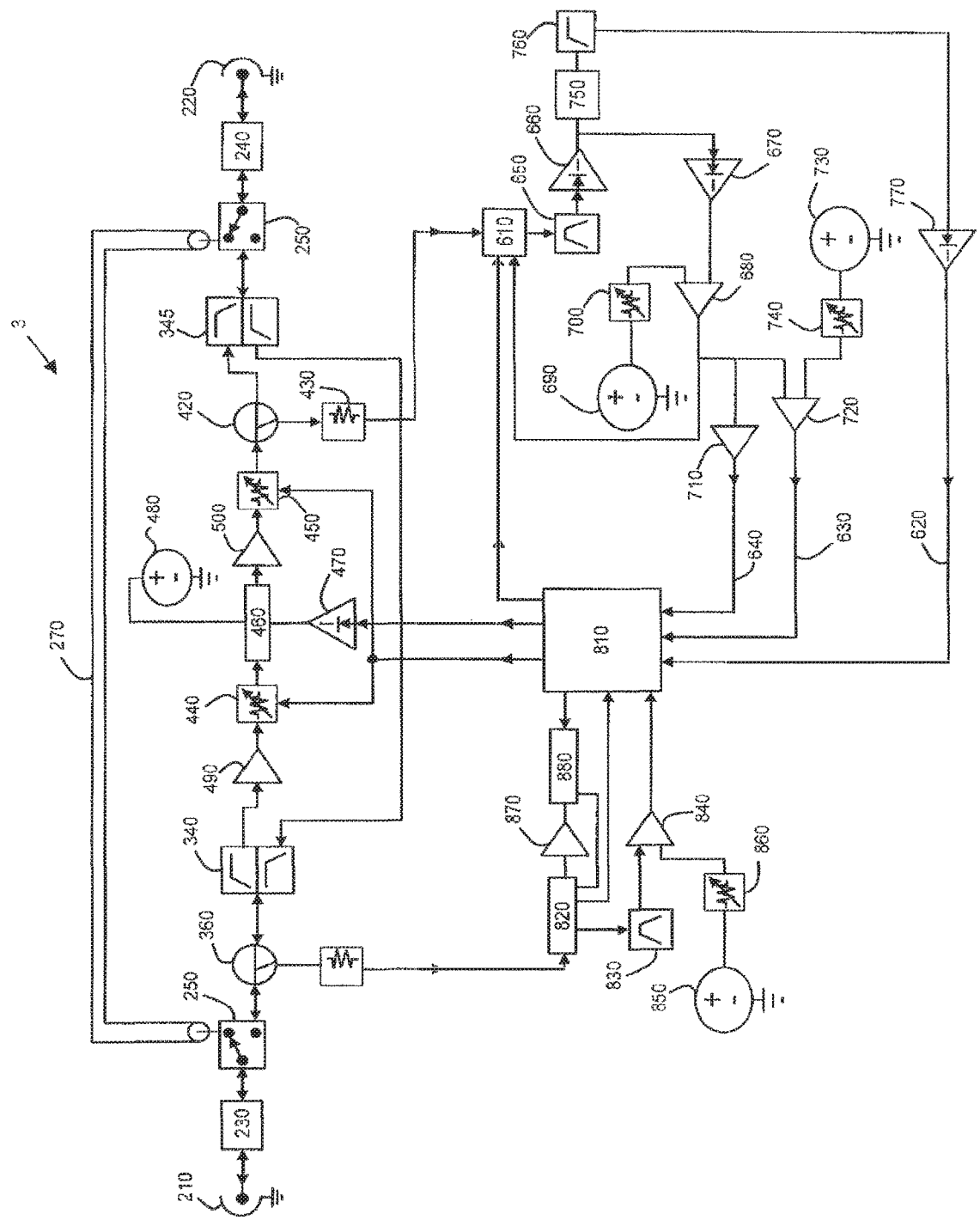
FIG. 8 is a circuit diagram representing a premise device including an automatic downstream bandwidth output level and/or output level tilt compensation device made in accordance with another embodiment of the present invention; (NOTE: manually inserted compensation devices have been common for years)

Along these lines, alternate embodiments of the premise device 100 are represented in FIGS. 5, 6a, 6b and 8. FIG. 5 represents an embodiment of the premise device 100 including only the configurable frequency band selection device 1. FIGS. 6a and 6b represent an embodiment of the premise device 100 including only the upstream bandwidth conditioning device 2. FIG. 8 represents an embodiment of the premise device 100 including only the downstream output level and/or output level tilt compensation device 3. It should be understood that the embodiments shown in FIGS. 5, 6a, 6b and 8 are presented to help clarify the components specific to the particular device, and that other embodiments including combinations of these are envisioned.

Individual components that are similar between the embodiments represented in FIGS. 3, 4, 5, 6a, 6b, and 8 are identified using the similar reference numbers. For example, the microprocessor represented in each of the embodiments is referenced using the number 810. One skilled in the art should know that the microprocessor could be the same or different across the embodiments depending on the requirements placed thereon.

As shown in FIG. 3, the main circuit 200 of the premise device 100 includes a supplier side 210 and a premise side 220. The supplier side 210 is positioned to receive the downstream bandwidth from the supplier 20 (FIG. 1) and to send the upstream bandwidth to the supplier 20. The premise side 220 is positioned to send the downstream bandwidth to the user and to receive the upstream bandwidth from the user. Each of the supplier side 210 and the premise side 220 can include a traditional threaded 75 ohm connector so that the premise device 100 can be easily placed in series with the drop transmission line 120 and the premise distribution system 130. Alternatively, each of the supplier side 210 and the premise side 220 may include a proprietary connecter to hinder attempts at tampering with or theft of the premise device 100. Other connectors may also be used depending on the type and/or size of the drop transmission line 120, the premise distribution system 130, or a system impedance other than 75 ohms.

The premise device 100 preferably includes a lightening protection device 230 positioned near the supplier side 210 and a lightening protection device 240 positioned near the premise side 220. Having two lightening protection devices 230, 240 attempts to protect the premise device 100 from energy passing from the drop transmission line 120 from a lighting strike and from energy passing from the premise distribution system 130 from a lighting strike. It should be understood that the lightening protection devices may not be necessary if/when the premise device 100 is configured to be placed in a CATV system that utilizes non-conductive signal transmission lines. Any of the high quality, commercially available lightning protection devices will function well within the specified locations within the premise device 100.

The premise device 100 preferably includes two power bypass failure switches 250, 260 that route all of the upstream\downstream signals through a bypass signal path 270 (e.g. a coaxial cable, an optical cable, a microstrip, a stripline, etc.) in the event of a power outage. The bypass failure switches 250, 260 are preferably located near the supplier end 210 and premise end 220, respectively. In an effort to protect the bypass failure switches 250, 260 from damage due to lightening energy, they are preferably placed between the lightening protection devices 230, 240 and the supplier end 210 and premise end 220.

Each of the bypass failure switches 250, 260 includes a default position bypassing the upstream/downstream signals through the bypass signal path 270 at any time power is removed from the premise device 100. When power is applied, each of the bypass failure switches 250, 260 actuate to a second position that disconnects the bypass signal path 270 and passes all of the upstream\downstream signal transmissions along another path through the circuit 205 (FIG. 4) within the main circuit 200. The switches may also be controlled such that when there is a fault detected in the premise device 100 that could abnormally hinder the flow of the upstream\downstream bandwidths through the circuit 205 (FIG. 4), the switches 250, 260 are moved to their default position sending the upstream/downstream signal transmissions through the bypass signal path 270. Any of the high quality, commercially available signal transmission switches will function well within the specified locations within the premise device 100. The bypass signal path 270 can be any suitable coaxial cable or optical cable depending on the CATV system configuration.

The premise device 100 preferably includes circuit components creating the frequency band selection device 1 (FIG. 5 and represented but not referenced in FIGS. 3 and 4). The frequency band selection device 1 is configured to automatically switch between a configuration corresponding to earlier Data Over Cable Service Interface Specification ("DOCSIS") specifications and a configuration corresponding to a later generation specification, such as DOCSIS 3.0. While this feature may be advantageous by itself in the premise device 100, this feature allows for other devices, such as the upstream bandwidth conditioning device 2 and the downstream bandwidth output level and/or output level tilt compensation device 3, to remain relevant after a change between specifications. In particular, because each of these devices requires an accurate separation of signals between the upstream bandwidth and the downstream bandwidth, any necessary change in the upstream/downstream bandwidths would render these specific devices inoperable. It should be understood that even though the DOCSIS specifications are referenced above and below, the upstream/downstream bandwidth configurations may be maintained and changed according to any specifications.

A simplified version of the of the frequency band selection device 1 is shown in FIG. 5 while all of the components are also present in the embodiment of FIGS. 3 and 4. The selection device 1 includes a plurality of switches 280, 290, 300, 310, 320, 330 that define a first signal path set 910 and second signal path set 920. Each signal path set includes two discrete signal paths, a high frequency signal path 930 and a low frequency signal path 940. The first signal path set 910 is formed using a pair of first frequency band splitting devices 340, 345, and the second signal path set 920 is formed using a pair of second frequency band splitting device 350, 355. A cutoff frequency set by the first pair of frequency band splitting devices 340, 345 corresponds to DOCSIS specifications having a narrower upstream bandwidth, and a cutoff frequency set by the second set pair of frequency band splitting devices 350, 355 corresponds to the later DOCSIS specifications, which include a broader upstream bandwidth than the earlier DOCSIS standards. It should be understood that the cutoff frequencies can be changed to accommodate even newer DOCSIS standards or other standards by the mere replacement of the first pair of frequency band splitting devices 340, 345 and/or the second pair of frequency band splitting devices 350, 355. Any of the high quality, commercially available switches and frequency band splitting devices will function well within the specified locations within the premise device 100.

Each of the switches 280, 290, 300, 310, 320, 330 is controlled either directly or indirectly by a microprocessor 810 (FIG. 3). The microprocessor 810 determines whether to actuate the switches 280, 290, 300, 310, 320, 330 to the first signal path set 910 or to the second signal path set 920 based on an information transmission signal preferably sent by the supplier 20. A signal coupler 360 allows for a receiver to 820 to receive the information transmission signal, such as a tone, a coded operational signal, or other well known information transmission, that can be understood by the microprocessor 810 to indicate the switch position. For example, the presence of an information signal can be used to indicate that the microprocessor 810 should select the second signal path set 920, whereas no information signal could indicate that microprocessor 810 should select the first signal path set 910. For example, the presence of a continuous tone at 900 MHz can be identified by passing a signal carrying such a tone through a band pass filter 830 to eliminate unnecessary signals and a comparator 840, which only provides a tone to the microprocessor when/if the tone is stronger than a predetermined threshold determined by a voltage source 850 and a resistive voltage divider 860. The frequency can be selected by the microprocessor 810 and can be tuned by a phase-locked loop control system 880 and an amplifier 870 in a manner well known in the art. Any of the high quality, commercially available microprocessors, signal couplers and receivers will function well within the specified locations with the premise device 100.

The premise device 100 preferably further includes circuit components creating the upstream bandwidth conditioning device 2, which automatically increases the signal to noise ratio of the upstream bandwidth created on the user's premise and passed into the upstream bandwidths on the main signal distribution system 30. It should be understood that with VOIP telephone service, the consistent flow of upstream data packets that lasts as long as the telephone call can appear to be noise (i.e., interference signals). Before VOIP, such continuous upstream flow data of data packets was not likely. Accordingly, the present device purposefully includes logic and structure that will halt the addition of attenuation once the maximum output of the cable modem is sensed even if the upstream data flow is consistent enough to be interpreted as noise.

As shown in FIGS. 3, 4, and 6a, the upstream bandwidth conditioning device 2 of one embodiment of the premise device 100 includes a variable attenuator 400 and an amplifier 410. The amount of signal level adjustment used to condition the upstream bandwidth is determined by the microprocessor 810 based on inputs from a signal level detector 390. The signal level detector 390 measures and maintains a contemporary peak signal strength of the upstream bandwidth via a tap 370 and a filter 380. The microprocessor 810 includes a counting circuit, a threshold comparison circuit and a level comparison circuit. It should be understood that even though a microprocessor 810 is used in the present embodiment, it is envisioned to control the variable attenuator 400 in the manner described using a traditional logic circuit.

As shown in FIG. 6b, another embodiment of the upstream bandwidth conditioning device 2 includes a variable amplifier 415, which is connected and controlled by the 810. According to this embodiment, an attenuator 405 is present and is not controlled by the microprocessor. Other embodiments are envisioned that include both a variable amplifier 415 and a variable attenuator 405. Further, the variable signal level adjustment device could also be an automatic gain control circuit ("AGC") and function well in the current device. In other words, it should also be understood that the amount of signal level adjustment and any incremental amount of additional signal level adjustment can be accomplished through any of a wide variety of amplification and/or attenuation devices.

In light of the forgoing, the term "variable signal level adjustment device" used herein should be understood to include not only a variable attenuation device, but also circuits containing a variable amplifier, AGC circuits, other variable amplifier/attenuation circuits, and related optical circuits that can be used to reduce the signal strength on the upstream bandwidth.

It should be noted that the term contemporary signal strength is intended to describe a current or present signal strength as opposed to a signal strength measured at a time in the past (i.e., a previous signal strength) such as prior to an application of signal level adjustment or an application of an additional amount of signal level adjustment. The reason for this point should be clear based on the following.

In operation, the microprocessor 810 within the upstream bandwidth conditioning device 2 performs a signal level setting routine 1000 (FIG. 7) to determine an appropriate amount of signal level adjustment to apply to the upstream bandwidth via the variable attenuator 400, the variable amplifier 415 or other suitable variable signal level adjustment device. The signal level setting routine can be run continuously, at predetermined intervals, and/or on command as a result of an information signal transmitted by the supplier 20. Once initiated, the microprocessor 810 or logic circuit performs the signal level setting routine in accordance with the flow chart shown in FIG. 7.

Figure 7:
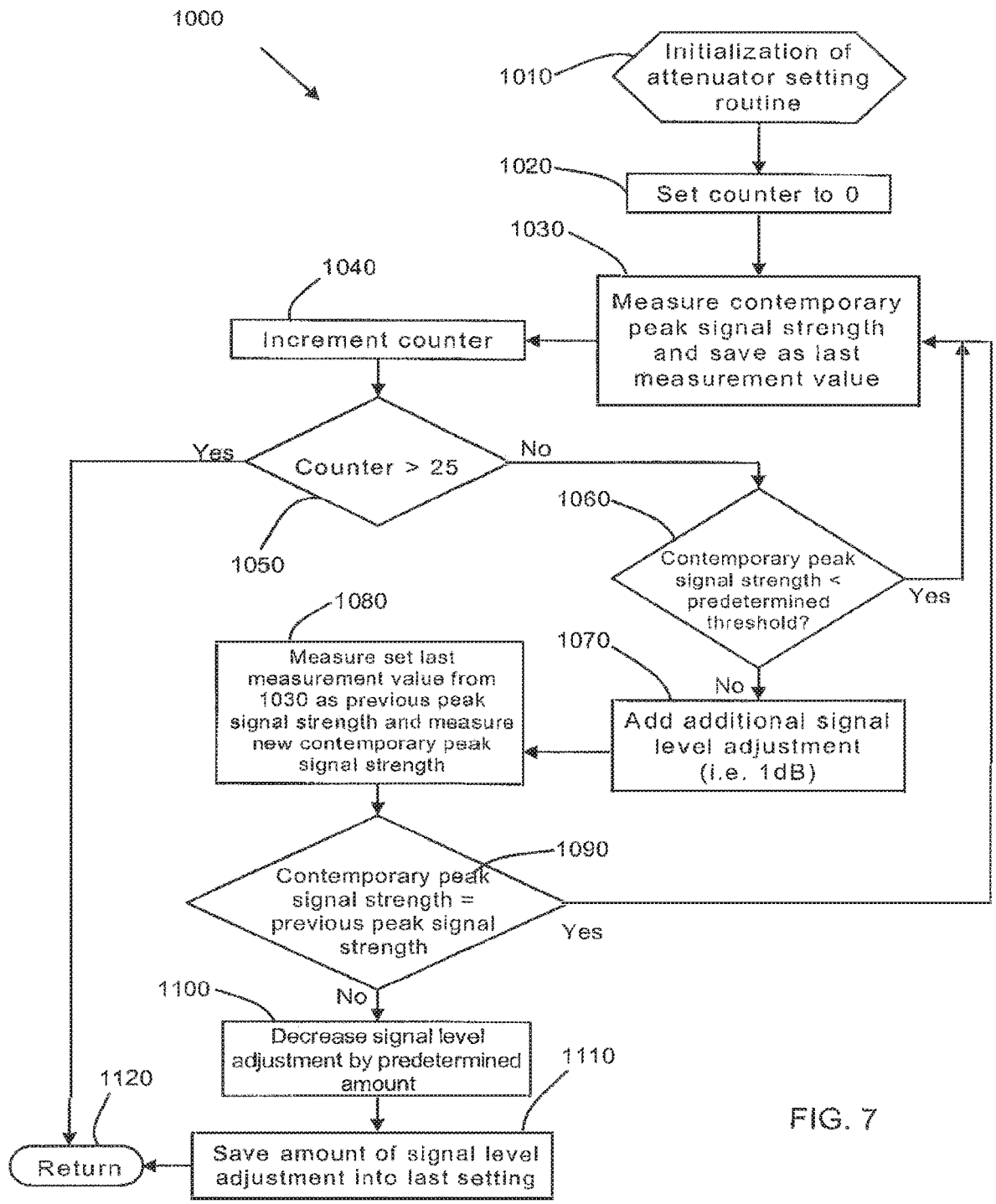
FIG. 7 is a flow chart representing an signal level adjustment setting routine performed by the circuit of FIGS. 6*a* and 6*b*.

Referring now to FIG. 7, upon initialization 1010 of the signal level setting routine 1000, the counting circuit in the microprocessor 810 is reset to zero (0), for example, in step 1020. Next, the microprocessor 810 iteratively performs steps 1030, 1040, 1050, 1060, 1070, 1080 and 1090 until the counter reaches a predetermined number (e.g. 25) or the answer to step 1080 is negative.

Specifically, in step 1030 the microprocessor 810 reads a contemporary signal strength from the signal level detector 390, and the counter is incremented by a predetermined increment, such as one (1) in step 1040. The microprocessor 810 then looks to see if the counter is greater than the predetermined number (i.e., 25). If so, the microprocessor 810 ends the routine, but if not, the microprocessor 810 proceeds to step 1060. In step 1060, the microprocessor 810 compares the contemporary signal strength to a predetermined threshold. If the contemporary signal strength is greater than the predetermined threshold, the microprocessor 810 instructs the variable attenuator 400 to add an amount of additional signal level adjustment (e.g. 1 dB), but if the contemporary signal strength is lower than the predetermined threshold, the microprocessor 810 returns to step 1030.

After adding the amount of additional signal level adjustment, the microprocessor 810 reads a new contemporary signal strength in step 1080 while saving the previously read contemporary signal strength (i.e., from step 1030) as a previous signal strength in preparation for step 1090. In step 1090, the microprocessor 810 compares the contemporary signal strength measured in step 1080 and the previous signal strength measured in step 1030 to one another. If the contemporary signal strength is equal to the previous signal strength then the microprocessor 810 returns to step 1030, but if the contemporary signal strength is less than the previous signal strength the microprocessor 810 proceeds to step 1100 where it instructs the variable attenuator 400 to reduce the amount of signal level adjustment by a predetermined amount (e.g. the amount of additional signal level adjustment added in step 1070 or an amount greater than the additional signal level adjustment added in step 1070). After step 1100, the microprocessor 810 saves the total amount of signal level adjustment in step 1110 and stops the routine at step 1120. Again, it should be understood that the amount of additional signal level adjustment may be added/removed by the variable amplifier 415, or by the AGC discussed above.

As mentioned above, an important aspect of the present signal level setting routine is the comparison step conducted in step 1090. A traditional cable modem 140 (FIG. 2) used in CATV systems can adjust its output level based on information signals received from the supper in the downstream bandwidth. In particular, if the modem signal received by the supplier 20 is weak, the supplier 20 instructs the modem 140 to increase its transmission signal level. As this relates to the current invention, the modem 140 will continually increase signal level as a result of increased amounts of upstream bandwidth signal level adjustment until the modem 140 can no longer increase its transmission signal strength. Accordingly, the contemporary signal strength measured in step 1080 after the addition of additional signal level adjustment in step 1070 should be equal to the previous signal strength if the modem 140 is able to compensate for the additional signal level adjustment. However, if the modem 140 is already producing its maximum signal strength, the contemporary signal strength will be less than the previous signal strength when an additional amount of upstream bandwidth signal level adjustment is applied.

Because problems could result in the modem 140 from operating it at its maximum output (i.e., signal distortion may be high when the modem 140 is operating at or near a maximum level and/or the durability of the modem 140 may be sacrificed when the modem 140 is operating at or near a maximum level), the amount of signal level adjustment may be reduced by a sufficient amount in step 1100 to ensure quality of the output signal generated by the modem 140 and the durability of the modem 140 once the maximum output strength of the modem 140 is identified.

It is noted that in a system with more than one device passing data packets into the upstream bandwidth, the premise device 100 may identify the maximum output strength of one device and not the other. In other words, the premise device 100 may identify the first device achieving its maximum output strength without proceeding to identify the maximum output strength of any other devices. If the premise device 100 fails to identify the first observed maximum output strength, that device may continue to operate at its maximum output strength until another determination cycle is initiated.

The predetermined number compared in 1050 can be related directly to the amount of signal level adjustment. For example, if the variable signal level adjustment device is a step attenuator including 25 steps of 1 dB attenuation, as is the case in the embodiment represented in FIG. 6a, the predetermined number can be set to 25 to allow for the finest resolution (i.e., 1 dB) and the broadest use of the particular step attenuator's range (i.e., 25 dB). It should be understood that the number of steps could be reduced and the resolution could be decreased (i.e., 5 steps of 5 dB) if faster overall operation is desired. It is also foreseeable that the predetermined number could be increased if a variable signal level adjustment device having a finer resolution (i.e., less than 1 dB) or a broader range (i.e., greater than 25 dB) is utilized. The incremented amount discussed here relating the counter and the predetermined number is one (1) such that there are 25 iterations (i.e., 25 steps) when the predetermined number is 25. The increment could easily be any number (i.e., 1, 5, 10, −1, −10, etc.) depending on the predetermined number and the total number of steps desired, which, as discussed above, is based on the desired resolution and the desired range of signal level adjustment.

The amount of additional attenuation added in step 1070, and the predetermined amount of attenuation reduced in step 1100 are all variables that are currently based, at least partially, on hardware design limitations and can, depending on the hardware, be adjusted by one skilled in the art based on the conditions experienced in a particular CATV system and with particular CATV equipment. As discussed above, the variable signal level adjustment device in one embodiment of the present invention is a step attenuator having a resolution of 1 dB and a range of 25 dB. Accordingly, the amount of additional attenuation added in step 1070 using the present hardware could be 1 dB or multiples of 1 dB. Similarly, the predetermined amount of attenuation reduced in step 1100 can be 1 dB or multiples of 1 dB. It should be understood that if the amount of additional attenuation added in step 1070 is a multiple of 1 dB, such as 5 dB, the amount of attenuation reduced in step 1100 can be a lesser amount, such as 2 dB or 4 dB. The amount of attenuation reduced in step 1100 can also be greater than the amount of additional attenuation added in step 1070 for the reasons stated above relating to maintaining the quality of the output from the modern 140 and the and durability of the modem 140.

The predetermined threshold compared in step 1060 is a signal level sufficient to distinguish the presence of upstream data packets in the upstream bandwidth from interference signals. This value will vary depending on the output power of any cable modem 140, STB, STU, etc. in the system and the average observed level of interference signals. A goal is, for example, to determine if a device is present that sends upstream data packets via the upstream bandwidth. If the predetermined threshold is set too low, the interference signals may appear to be upstream data packets, but if the predetermined threshold is set too high, the upstream data packets may appear as interference signals.

Any of the high quality, commercially available signal couplers, signal level detectors, variable attenuation devices, filters, amplifiers, and microprocessors will function well within the specified locations within the premise device 100.

Referring now to FIGS. 3, 4, and 8, the premise device 100 preferably includes circuit components creating the downstream bandwidth output level and/or output level tilt compensation device 3, which helps to maintain a desired signal quality in transmitted signals using relatively high frequencies within the downstream bandwidth, which are much more susceptible to traditional parasitic losses. At a simplistic level, the microprocessor 810 observes channel data obtained from the tuner circuit 600, compares the observed channel data to a known parasitic loss curve, and then adjusts a pair of variable output level compensation devices 440, 450 and a variable slope adjusting circuit 460 located in the circuit 200 to create an output having a desired gain curve (i.e., a curve representative of transmitted signal strengths) across the downstream bandwidth. While each of the variable output level compensation devices 440, 450 are depicted in FIGS. 4 and 8 as a variable attenuator, it should be understood that the term "variable output level compensation device" used herein should be understood to include not only a variable attenuation device, but also circuits containing a variable amplifier, AGO circuits, other variable amplifier/attenuation circuits, and related optical circuits that can be used to alter the signal strength of signals in the downstream bandwidth. Each of these steps will be discussed in further detail below.

The tuner circuit 600 obtains the downstream bandwidth from a coupler 420 drawing the downstream bandwidth off of the high frequency signal path 930 (FIG. 5). Please note that these signals will be referred to herein as the coupled downstream bandwidth. The coupled downstream bandwidth is passed through a resistor 430 prior to being passed into a tuner 610.

Figure 9:
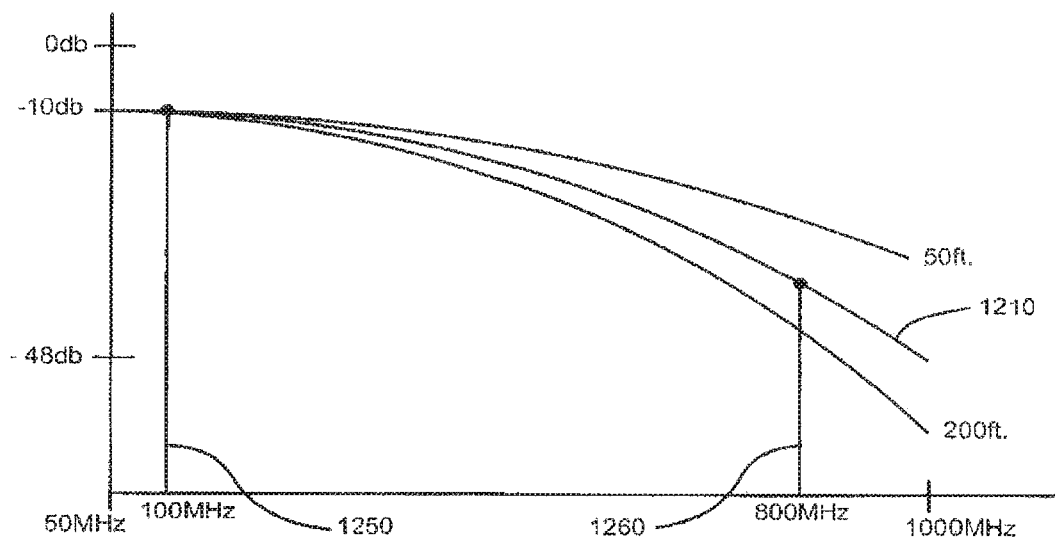
FIG. 9 is a graphical representation of an interpolated gain curve determined in accordance with the device represented in FIG. 8.

Through instructions provided by the microprocessor 810, the tuner 610 scans the coupled downstream bandwidth in an effort to locate and identify a channel having a low frequency, referred to herein as a low band signal channel 1250 (FIG. 9), and a channel having a high frequency, referred to herein as a high band signal channel 1260 (FIG. 9). In the present instance, the microprocessor 810 instructs the tuner 610 to begin at the lowest frequency in the downstream bandwidth and scan toward higher frequencies until the low band signal channel 1250 is found. Similarly, the microprocessor 810 instructs the tuner 610 to begin at the highest frequency in the coupled downstream bandwidth and scan toward lower frequencies until the high band signal channel 1260 is found. Accordingly, the low band signal channel 1250 is a channel located near the lowest frequency within the coupled downstream bandwidth while the high band channel 1260 is a channel located near the highest frequency within the coupled downstream bandwidth. Even though the low band signal channel 1250 and the high band signal channel 1260 are depicted in FIG. 9 as a single frequency for clarity, it should be understood that a channel is typically a range of frequencies. It should also be understood that the low band signal channel 1250 and the high band signal channel 1260 do not need to be the lowest or highest frequency channels, respectively. It is beneficial, however that the two channels be spaced as far apart from one another as practical to better estimate the amount of parasitic loss experiences across the entire downstream bandwidth.

During the scanning process to locate and identify the low and high band signal channels 1250, 1260, the tuner circuit 600 provides the microprocessor 810 with three types of information. First, a signal indicating that a channel has been identified is provided to the microprocessor 810 through input line 640. Second, a signal indicating signal strength of the identified channel is provided to the microprocessor 810 through input line 630. Third, a signal indicating the format of the identified channel is provided to the microprocessor 810 through input line 620.

The signal indicating that a channel has been identified is created by passing the coupled downstream bandwidth though a band pass filter 650 to remove extraneous noise, a signal level detector 660 to convert signal into a voltage, and another signal level detector 670. The signal leaving the signal level detector 670 is compared to a predetermined threshold voltage using comparator 680. The predetermined threshold voltage is created using a voltage source 690 and an resistive divider 700, and is set such that if the voltage associated with the coupled downstream bandwidth at the tuner frequency is greater than the threshold voltage, it is likely a channel in use by the supplier 20, whereas if the voltage associated with the coupled downstream bandwidth at the tuner frequency is less than the threshold voltage, it is likely interference signals.

The signal indicating signal strength is created similarly to the signal indicating that a channel has been identified. The signal indicating signal strength passes through comparator 720 when it is greater than a threshold voltage created by a voltage source 730 and a resistive divider 740. To clarify the differences, the signal indicating that a channel has been identified may not have any direct relation to the actual signal strength, whereas the signal indicating signal strength is directly proportional to the actual signal strength of the identified channel.

The signal indicating the format of the identified channel is created when the coupled downstream bandwidth passes through a channel analyzer, which includes the band pass filter 650, the signal level detector 660, a synch detector 750, a low pass filter 760, and a signal level detector 770. The resulting signal identifies whether the identified channel is an analog format channel or another type of signal format.

According to current signal transmission specifications, digital format channels have a signal strength that is typically 6 dB less than a corresponding analog channel. Accordingly, the microprocessor 810 must include a level offset calculation that can account for this 6 dB difference when comparing the relative signal strengths of the low and high band signal channels 1250, 1260. If this inherent difference is not accounted for, any resulting comparisons of the two channels 1250, 1260 for the purpose of determining relative signal strengths would necessarily be flawed. For example, if the high band channel 1260 is digital while the low band channel 1250 is analog, the additional, inherent 6 dB difference would incorrectly indicate that there is more parasitic losses than there actually is. Similarly, if the high band channel 1260 is analog and the low band channel 1250 is digital, any resulting comparison would incorrectly indicate that there is less parasitic loss that there actually is. Therefore, it should be understood that it does not matter whether the 6 dB offset is added to the signal strength of a digital format channel or the 6 dB offset is subtracted from the signal strength of an analog format channel. Further, it should be understood that the 6 dB offset can be added to the signal strength of both the low and high band channels 1250, 1260 if they are both digital or the 6 dB offset can be subtracted from the signal strength of both the low and high band channels 1250, 1260 if they are both analog, Even further, it should be understood that the offset value is dictated by the standards observed by a particular supplier and can be, therefore, a value other than 6 dB.

After completing the scanning process and the process of adding/removing any offsets, the microprocessor 810 now has a low band signal strength (including any offset), a low band channel frequency, a high band signal strength (including any offset), and a high band channel frequency. The known information (i.e., the strength and frequency) of the low and high band channels 1250, 1260 are now compared, by the microprocessor 810, to a predetermined signal strength loss curve (i.e., a gain loss curve), which corresponds to the known parasitic losses associated with the type of coaxial/optical cables used, as shown in FIG. 9. This step beneficially allows the known information to be interpolated across the entire downstream bandwidth. Using the interpolated curve, the microprocessor 810 determines how much signal level adjustment to apply and in what manner to apply the level adjustment across the entire downstream bandwidth such that the a resulting gain curve across the entire bandwidth is nearly linear and preferably with a slight increase in gain toward the higher frequencies in anticipation of parasitic losses that will occur downstream from the premise device 100. For example, the amount of level is determined by the high band signal strength (i.e., high band gain) including any interpolation to the highest frequency, and the amount of level reduction is determined by the low band signal strength (i.e., low band level) including any interpolation to the lowest frequency.

It should be understood that parasitic losses affect higher frequencies more than lower frequencies. Accordingly, if a known signal having a −10 dB signal strength, for example, is transmitted at various frequencies across the entire downstream bandwidth and across a length of coaxial/optical cable, a plot of the resulting gain curve would result in a curve, which is known. Because the end goal is to have a gain curve that is a straight line near the original signal strengths or to have a gain curve that has an increasing slope versus frequency, the microprocessor 810 directly controls the variable slope adjustment circuit to adjust the downstream signal transmission in curve such that the lower frequencies are lower in amplitude than the higher frequencies.

Figure 10:
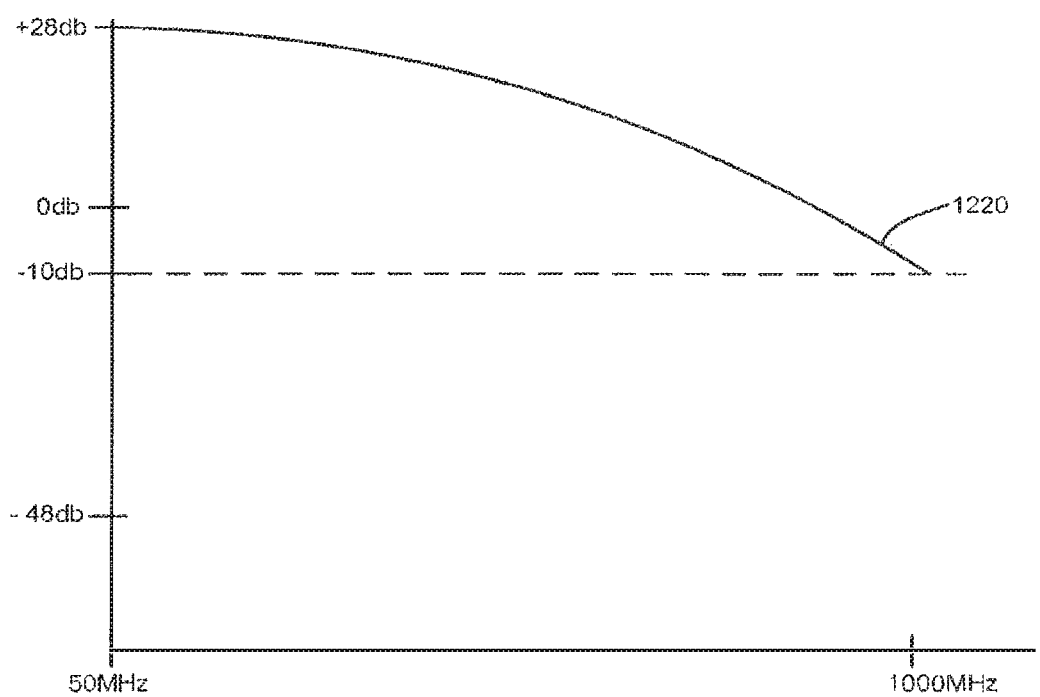
FIG. 10 is a graphical representation of a gain curve determined in accordance with the device represented in FIG. 8.
Figure 11:
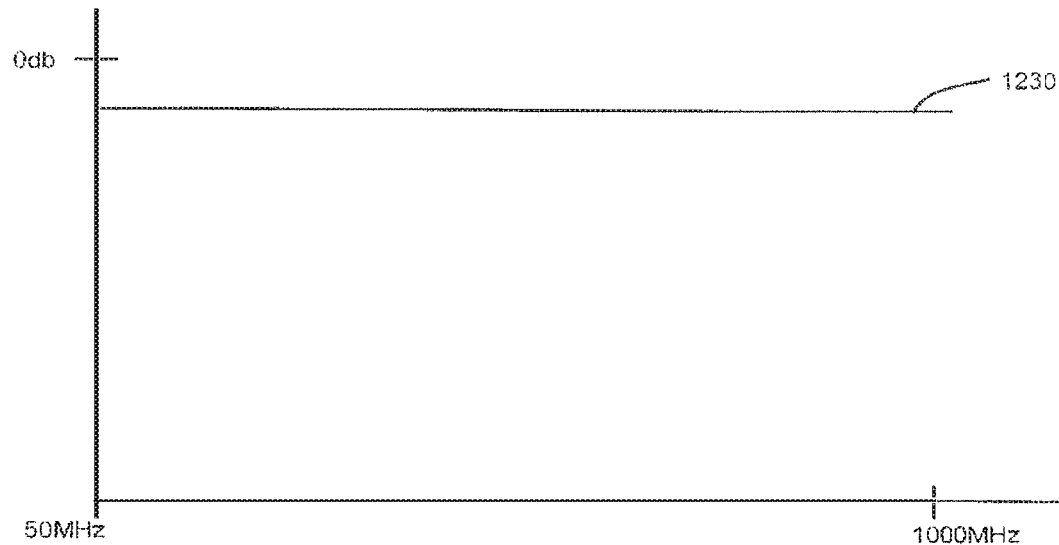
FIG. 11 is a graphical representation of a gain curve determined in accordance with the device represented in FIG. 8.
Figure 12:
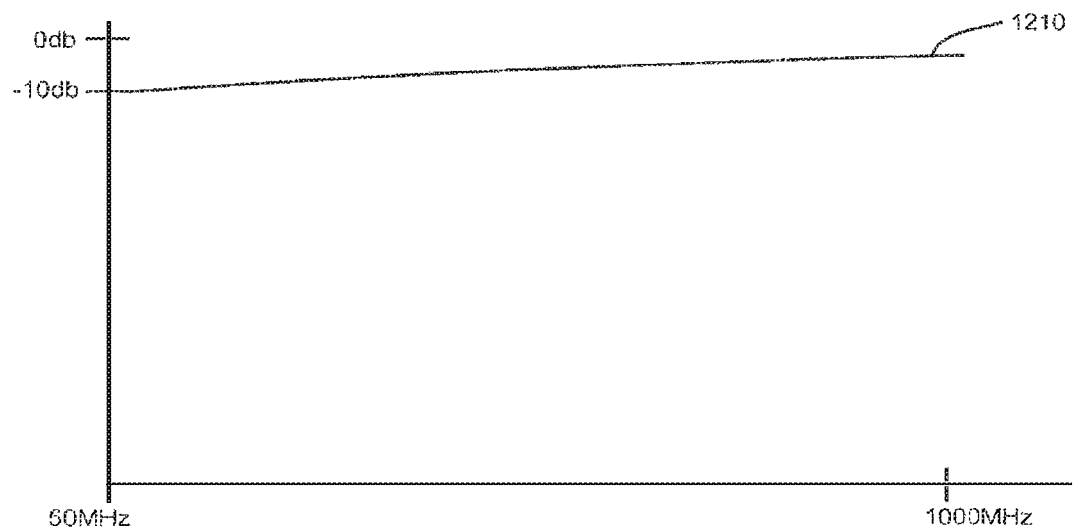
FIG. 12 is a graphical representation of a gain curve determined in accordance with the device represented in FIG. 8.

For example, as shown in FIG. 9, using the known frequency and signal strength for each of the low band channel 1250 and the high band channel 1260, a gain curve 1210 can be plotted across the entire downstream bandwidth, which is shown, for example, as being from 50 MHz to 1000 MHz. The microprocessor 810 then determines a total amount of level adjustment to be added by the amplifier 490 and/or the amplifier 500 that will at least replace the loss at the highest frequency. In the present example, the amount of level adjustment would be at least +38 dB, resulting in a gain curve 1220 that is shown in FIG. 10. Based on the interpolated gain curve shown in FIG. 9, the microprocessor 810 instructs the variable slope circuit 460 to apply a similar, but inversely curved amount of correction to result in a relatively flat gain curve 1230 shown in FIG. 10. It may be desirable to increase the amount of level adjustment applied and increase the curvature of the slope adjustment to result in a gain curve 1240, as shown in FIG. 8, which has an increasing slope toward the higher frequencies.

As with the other devices discussed above, the downstream bandwidth output level and/or output level tilt compensation device 3 can be activated automatically upon initialization of the premise device 100, a set intervals, upon the occurrence of a particular event, and/or upon receipt of an information signal (e.g. a tone, a coded operating signal, etc.) from the supplier 20.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

The following is claimed:

1. A compensation device for maintaining a desired signal quality in transmitted signals, the compensation device comprising:
   a signal strength loss curve comparison component configured to compare a predetermined signal strength loss curve to a low band signal strength of a radio-frequency (RF) signal and a high band signal strength of the RF signal, wherein the RF signal is in an amplified forward path of a premise device; and
   a gain curve adjustment component configured to add a level adjustment to the RF signal to cause a gain curve to be linear in response to the comparison.

2. The compensation device of claim 1, wherein the signal strength loss curve comparison component is configured to:
   receive the low band signal strength of the RF signal from a tuner circuit;
   compare the predetermined signal strength loss curve to the low band signal strength of the RF signal; and
   cause the gain curve adjustment component to add the level adjustment.

3. The compensation device of claim 2, wherein the gain curve adjustment component comprises:
   a first variable output level compensation device;
   a second variable output level compensation device; and
   a variable slope adjusting circuit connected to and positioned between the first and second variable output level compensation devices.

4. The compensation device of claim 3, wherein the signal strength loss curve comparison component comprises a microprocessor that is electrically connected to the first variable output level compensation device, the second variable output level compensation device, the variable slope adjusting circuit, and the tuner circuit.

5. The compensation device of claim 3, wherein the first variable output level compensation device comprises a variable attenuator.

6. The compensation device of claim 1, wherein the compensation device is in the amplified forward path, and wherein the amplified forward path is configured to communicate the RF signal from an input connector of the premise device to an output connector of the premise device.

7. The compensation device of claim 6, wherein the RF signal comprises an upstream signal and a downstream signal, the compensation device further comprising:
   a return path configured to communicate the upstream signal from the output connector to the input connector;
   a bypass path configured to communicate the downstream signal from the input connector to the output connector, and to communicate the upstream signal from the output connector to the input connector; and
   a voltage sensor in communication with the amplified forward path and not in communication with the return path, wherein the voltage sensor is configured to detect voltage in the amplified forward path.

8. The compensation device of claim 7, further comprising a switch configured to route the RF signal through the amplified forward path in response to a first condition, and to route the RF signal through the bypass path in response to a second condition.

9. The compensation device of claim 8, wherein the first condition comprises the voltage in the amplified forward path being at or above a threshold voltage, and wherein the second condition comprises the voltage in the amplified forward path being below the threshold voltage.

10. The compensation device of claim 1, wherein the level adjustment causes the gain curve to have a constant gain as a frequency of the RF signal increases.

11. The compensation device of claim 1, wherein the level adjustment causes the gain curve to increase as a frequency of the RF signal increases.

12. The compensation device of claim 1, wherein, prior to the level adjustment, the gain curve comprises a gain that decreases as a frequency of the RF signal increases.

13. The compensation device of claim 12, wherein the level adjustment comprises an inversely curved amount of correction to the gain curve.

14. A compensation device for maintaining a desired signal quality in transmitted signals, the compensation device comprising:
a comparison component configured to compare a signal strength loss curve to a low band signal strength of a radio-frequency (RF) signal and a high band signal strength of the RF signal, wherein the RF signal is in an amplified forward path of a premise device; and
a gain curve adjustment component configured to add a level adjustment to the RF signal to cause a gain curve to be linear in response to the comparison by the comparison component.

15. The compensation device of claim 14, wherein the comparison component is configured to:
receive the low band signal strength of the RF signal from a tuner circuit;
compare the signal strength loss curve to the low band signal strength of the RF signal; and
cause the gain curve adjustment component to add the level adjustment.

16. The compensation device of claim 15, wherein the gain curve adjustment component comprises:
a first variable output level compensation device;
a second variable output level compensation device; and
a variable slope adjusting circuit connected to and positioned between the first and second variable output level compensation devices.

17. The compensation device of claim 16, wherein the comparison component comprises a microprocessor that is electrically connected to the first variable output level compensation device, the second variable output level compensation device, the variable slope adjusting circuit, and the tuner circuit.

18. The compensation device of claim 16, wherein the first variable output level compensation device comprises a variable attenuator.

19. The compensation device of claim 14, wherein the compensation device is in the amplified forward path, and wherein the amplified forward path is configured to communicate the RF signal from an input connector of the premise device to an output connector of the premise device.

20. The compensation device of claim 19, wherein the RF signal comprises an upstream signal and a downstream signal, the compensation device further comprising:
a return path configured to communicate the upstream signal from the output connector to the input connector;
a bypass path configured to communicate the downstream signal from the input connector to the output connector, and to communicate the upstream signal from the output connector to the input connector; and
a voltage sensor in communication with the amplified forward path and not in communication with the return path, wherein the voltage sensor is configured to detect voltage in the amplified forward path.

21. The compensation device of claim 20, further comprising a switch configured to route the RF signal through the amplified forward path in response to a first condition, and to route the RF signal through the bypass path in response to a second condition.

22. The compensation device of claim 21, wherein the first condition comprises the voltage in the amplified forward path being at or above a threshold voltage, and wherein the second condition comprises the voltage in the amplified forward path being below the threshold voltage.

23. A compensation device for maintaining a desired signal quality in transmitted signals, the compensation device comprising:
a signal strength loss comparator configured to compare a signal strength loss threshold to a low band signal strength of a radio-frequency (RF) signal and a high band signal strength of the RF signal, wherein the RF signal is in an amplified forward path of a premise device; and
a gain curve adjuster configured to add a level adjustment to the RF signal in the amplified forward path of the premise device to cause a gain curve to be linear based on only the comparison by the signal strength loss comparator.

24. The compensation device of claim 23, wherein the signal strength loss comparator is configured to:
receive the low band signal strength of the RF signal from a tuner circuit;
compare the signal strength loss threshold to the low band signal strength of the RF signal; and
cause the gain curve adjuster to add the level adjustment.

25. The compensation device of claim 24, wherein the gain curve adjuster comprises:
a first variable output level compensation device;
a second variable output level compensation device; and
a variable slope adjusting circuit connected to and positioned between the first and second variable output level compensation devices.

26. The compensation device of claim 25, wherein the signal strength loss comparator comprises a microprocessor that is electrically connected to the first variable output level compensation device, the second variable output level compensation device, the variable slope adjusting circuit, and the tuner circuit.

27. The compensation device of claim 25, wherein the first variable output level compensation device comprises a variable attenuator.

28. The compensation device of claim 23, wherein the compensation device is in the amplified forward path, and wherein the amplified forward path is configured to communicate the RF signal from an input connector of the premise device to an output connector of the premise device.

29. The compensation device of claim 28, wherein the RF signal comprises an upstream signal and a downstream signal, the compensation device further comprising:
- a return path configured to communicate the upstream signal from the output connector to the input connector;
- a bypass path configured to communicate the downstream signal from the input connector to the output connector, and to communicate the upstream signal from the output connector to the input connector; and
- a voltage sensor in communication with the amplified forward path and not in communication with the return path, wherein the voltage sensor is configured to detect voltage in the amplified forward path.

30. The compensation device of claim 29, further comprising a switch configured to route the RF signal through the amplified forward path in response to a first condition, and to route the RF signal through the bypass path in response to a second condition.

31. The compensation device of claim 30, wherein the first condition comprises the voltage in the amplified forward path being at or above a threshold voltage, and wherein the second condition comprises the voltage in the amplified forward path being below the threshold voltage.

32. A compensation device for maintaining a desired signal quality in transmitted signals, the compensation device comprising:
- a signal strength loss comparator configured to compare a signal strength loss threshold to a low band signal strength of a radio-frequency (RF) signal and a high band signal strength of the RF signal, wherein the RF signal is in an amplified forward path of a premise device; and
- a gain curve adjuster configured to cause the compensation device to add a level adjustment to the RF signal in the amplified forward path of the premise device to cause a gain curve to be linear based on the comparison by the signal strength loss comparator.

33. The compensation device of claim 32, wherein the signal strength loss comparator is configured to:
- receive the low band signal strength of the RF signal from a tuner circuit;
- compare the signal strength loss threshold to the low band signal strength of the RF signal; and
- cause the gain curve adjuster to add the level adjustment.

34. The compensation device of claim 33, wherein the gain curve adjuster comprises:
- a first variable output level compensation device;
- a second variable output level compensation device; and
- a variable slope adjusting circuit connected to and positioned between the first and second variable output level compensation devices.

35. The compensation device of claim 34, wherein the signal strength loss comparator comprises a microprocessor that is electrically connected to the first variable output level compensation device, the second variable output level compensation device, the variable slope adjusting circuit, and the tuner circuit.

36. The compensation device of claim 34, wherein the first variable output level compensation device comprises a variable attenuator.

37. The compensation device of claim 32, wherein the compensation device is in the amplified forward path, and wherein the amplified forward path is configured to communicate the RF signal from an input connector of the premise device to an output connector of the premise device.

38. The compensation device of claim 37, wherein the RF signal comprises an upstream signal and a downstream signal, the compensation device further comprising:
- a return path configured to communicate the upstream signal from the output connector to the input connector;
- a bypass path configured to communicate the downstream signal from the input connector to the output connector, and to communicate the upstream signal from the output connector to the input connector; and
- a voltage sensor in communication with the amplified forward path and not in communication with the return path, wherein the voltage sensor is configured to detect voltage in the amplified forward path.

39. The compensation device of claim 38, further comprising a switch configured to route the RF signal through the amplified forward path in response to a first condition, and to route the RF signal through the bypass path in response to a second condition.

40. The compensation device of claim 39, wherein the first condition comprises the voltage in the amplified forward path being at or above a threshold voltage, and wherein the second condition comprises the voltage in the amplified forward path being below the threshold voltage.

41. Compensation means for maintaining a desired signal quality in transmitted signals, the compensation means comprising:
- signal strength loss comparison means for comparing a signal strength loss threshold to a low band signal strength of a radio-frequency (RF) signal and a high band signal strength of the RF signal, wherein the RF signal is in an amplified forward path of a premise device; and
- gain curve adjustment means for causing the compensation means to add a level adjustment to the RF signal in the amplified forward path of the premise device to cause a gain curve to be linear based on the comparison by the signal strength loss comparison means.

42. The compensation means of claim 41, wherein the signal strength loss comparison means is configured to:
- receive the low band signal strength of the RF signal from a tuner circuit;
- compare the signal strength loss threshold to the low band signal strength of the RF signal; and
- cause the gain curve adjustment means to add the level adjustment.

43. The compensation means of claim 42, wherein the gain curve adjustment means comprises:
- a first variable output level compensation device;
- a second variable output level compensation device; and
- a variable slope adjusting circuit connected to and positioned between the first and second variable output level compensation devices.

44. The compensation means of claim 43, wherein the signal strength loss comparison means comprises a microprocessor that is electrically connected to the first variable output level compensation device, the second variable output level compensation device, the variable slope adjusting circuit, and the tuner circuit.

45. The compensation means of claim 43, wherein the first variable output level compensation device comprises a variable attenuator.

46. The compensation means of claim 41, wherein the compensation means is in the amplified forward path, and wherein the amplified forward path is configured to communicate the RF signal from an input connector of the premise device to an output connector of the premise device.

47. The compensation means of claim 46, wherein the RF signal comprises an upstream signal and a downstream signal, the compensation means further comprising:
- a return path configured to communicate the upstream signal from the output connector to the input connector;
- a bypass path configured to communicate the downstream signal from the input connector to the output connector, and to communicate the upstream signal from the output connector to the input connector; and
- a voltage sensor in communication with the amplified forward path and not in communication with the return path, wherein the voltage sensor is configured to detect voltage in the amplified forward path.

48. The compensation means of claim 47, further comprising a switch configured to route the RF signal through the amplified forward path in response to a first condition, and to route the RF signal through the bypass path in response to a second condition.

49. The compensation means of claim 48, wherein the first condition comprises the voltage in the amplified forward path being at or above a threshold voltage, and wherein the second condition comprises the voltage in the amplified forward path being below the threshold voltage.

50. A compensation device for maintaining a desired signal quality in transmitted signals in an amplified forward path of a premise device, the compensation device comprising:
- a signal strength loss comparison component configured to compare a predetermined loss curve threshold to a low band signal strength of a radio-frequency (RF) signal through the amplified forward path of the premise device and compare the predetermined loss curve threshold to a high band signal strength of the RF signal through the amplified forward path of the premise device; and
- an output adjustment component configured to cause the compensation device to add a level adjustment to the RF signal to cause a gain curve to be linear based on the comparison by the signal strength loss comparison component.

51. The compensation device of claim 50, wherein the signal strength loss comparison component is configured to:
- receive the low band signal strength of the RF signal from a tuner circuit;
- compare the predetermined loss curve threshold to the low band signal strength of the RF signal; and
- cause the output adjustment component to add the level adjustment.

52. The compensation device of claim 51, wherein the output adjustment component comprises:
- a first variable output level compensation device;
- a second variable output level compensation device; and
- a variable slope adjusting circuit connected to and positioned between the first and second variable output level compensation devices.

53. The compensation device of claim 52, wherein the signal strength loss comparison component comprises a microprocessor that is electrically connected to the first variable output level compensation device, the second variable output level compensation device, the variable slope adjusting circuit, and the tuner circuit.

54. The compensation device of claim 52, wherein the first variable output level compensation device comprises a variable attenuator.

55. The compensation device of claim 54, wherein the compensation device is in the amplified forward path, and wherein the amplified forward path is configured to communicate the RF signal from an input connector of the premise device to an output connector of the premise device.

56. The compensation device of claim 55, wherein the RF signal comprises an upstream signal and a downstream signal, the compensation device further comprising:
- a return path configured to communicate the upstream signal from the output connector to the input connector;
- a bypass path configured to communicate the downstream signal from the input connector to the output connector, and to communicate the upstream signal from the output connector to the input connector; and
- a voltage sensor in communication with the amplified forward path and not in communication with the return path, wherein the voltage sensor is configured to detect voltage in the amplified forward path.

57. The compensation device of claim 56, further comprising a switch configured to route the RF signal through the amplified forward path in response to a first condition, and to route the RF signal through the bypass path in response to a second condition.

58. The compensation device of claim 57, wherein the first condition comprises the voltage in the amplified forward path being at or above a threshold voltage, and wherein the second condition comprises the voltage in the amplified forward path being below the threshold voltage.

59. A compensation device for maintaining a desired signal quality in transmitted signals in an amplified forward path of a premise device, the compensation device comprising:
- a signal strength loss comparator configured to compare a loss curve threshold to a low band signal strength of a radio-frequency (RF) signal through the amplified forward path of the premise device and compare the loss curve threshold to a high band signal strength of the RF signal through the amplified forward path of the premise device; and
- an output adjustor configured to cause the compensation device to add a level adjustment to the RF signal to cause a gain curve to be linear based on the comparison by the signal strength loss comparator.

60. The compensation device of claim 59, wherein the signal strength loss comparator is configured to:
- receive the low band signal strength of the RF signal from a tuner circuit;
- compare the loss curve threshold to the low band signal strength of the RF signal; and
- cause the output adjustor to add the level adjustment.

61. The compensation device of claim 60, wherein the output adjustor comprises:
- a first variable output level compensation device;
- a second variable output level compensation device; and
- a variable slope adjusting circuit connected to and positioned between the first and second variable output level compensation devices.

62. The compensation device of claim 61, wherein the signal strength loss comparator comprises a microprocessor that is electrically connected to the first variable output level compensation device, the second variable output level compensation device, the variable slope adjusting circuit, and the tuner circuit.

63. The compensation device of claim 61, wherein the first variable output level compensation device comprises a variable attenuator.

64. The compensation device of claim 59, wherein the compensation device is in the amplified forward path, and wherein the amplified forward path is configured to communicate the RF signal from an input connector of the premise device to an output connector of the premise device.

65. The compensation device of claim 64, wherein the RF signal comprises an upstream signal and a downstream signal, the compensation device further comprising:
 a return path configured to communicate the upstream signal from the output connector to the input connector;
 a bypass path configured to communicate the downstream signal from the input connector to the output connector, and to communicate the upstream signal from the output connector to the input connector; and
 a voltage sensor in communication with the amplified forward path and not in communication with the return path, wherein the voltage sensor is configured to detect voltage in the amplified forward path.

66. The compensation device of claim 65, further comprising a switch configured to route the RF signal through the amplified forward path in response to a first condition, and to route the RF signal through the bypass path in response to a second condition.

67. The compensation device of claim 66, wherein the first condition comprises the voltage in the amplified forward path being at or above a threshold voltage, and wherein the second condition comprises the voltage in the amplified forward path being below the threshold voltage.

68. Compensation means for maintaining a desired signal quality in transmitted signals in an amplified forward path of a premise device, the compensation means comprising:
 comparison means for comparing a loss curve threshold to a low band signal strength of a radio-frequency (RF) signal through the amplified forward path of the premise device and comparing the loss curve threshold to a high band signal strength of the RF signal through the amplified forward path of the premise device; and
 adjustment means for causing the compensation means to add a level adjustment to the RF signal to cause a gain curve to be linear based on the comparison by the comparison means.

69. The compensation means of claim 68, wherein the comparison means is configured to:
 receive the low band signal strength of the RF signal from a tuner circuit;
 compare the loss curve threshold to the low band signal strength of the RF signal; and
 cause the adjustment means to add the level adjustment.

70. The compensation means of claim 69, wherein the adjustment means comprises:
 a first variable output level compensation device;
 a second variable output level compensation device; and
 a variable slope adjusting circuit connected to and positioned between the first and second variable output level compensation devices.

71. The compensation means of claim 70, wherein the comparison means comprises a microprocessor that is electrically connected to the first variable output level compensation device, the second variable output level compensation device, the variable slope adjusting circuit, and the tuner circuit.

72. The compensation means of claim 70, wherein the first variable output level compensation device comprises a variable attenuator.

73. The compensation means of claim 68, wherein the compensation means is in the amplified forward path, and wherein the amplified forward path is configured to communicate the RF signal from an input connector of the premise device to an output connector of the premise device.

74. The compensation means of claim 63, wherein the RF signal comprises an upstream signal and a downstream signal, the compensation device further comprising:
 a return path configured to communicate the upstream signal from the output connector to the input connector;
 a bypass path configured to communicate the downstream signal from the input connector to the output connector, and to communicate the upstream signal from the output connector to the input connector; and
 a voltage sensor in communication with the amplified forward path and not in communication with the return path, wherein the voltage sensor is configured to detect voltage in the amplified forward path.

75. The compensation means of claim 63, further comprising a switch configured to route the RF signal through the amplified forward path in response to a first condition, and to route the RF signal through the bypass path in response to a second condition.

76. The compensation means of claim 63, wherein the first condition comprises the voltage in the amplified forward path being at or above a threshold voltage, and wherein the second condition comprises the voltage in the amplified forward path being below the threshold voltage.

* * * * *

UNITED STATES PATENT AND TRADEMARK OFFICE
CERTIFICATE OF CORRECTION

PATENT NO. : 10,924,811 B2  
APPLICATION NO. : 16/280277  
DATED : February 16, 2021  
INVENTOR(S) : Thomas A. Olson et al.

It is certified that error appears in the above-identified patent and that said Letters Patent is hereby corrected as shown below:

In the Claims

Column 24, Claim 74., Line 22, "The compensation means of claim 63, wherein the RF" should read -- The compensation means of claim 73, wherein the RF --

Column 24, Claim 75., Line 35, "The compensation means of claim 63, further com-" should read -- The compensation means of claim 74, further com- --

Column 24, Claim 76., Line 40, "The compensation means of claim 63, wherein the first" should read -- The compensation means of claim 75, wherein the first --

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*